US010612952B2

(12) United States Patent
Crawford et al.

(10) Patent No.: US 10,612,952 B2
(45) Date of Patent: Apr. 7, 2020

(54) AUTOMATIC PULSE TRACER VELOCIMETER

(71) Applicant: University of Central Florida Research Foundation, Inc., Orlando, FL (US)

(72) Inventors: A. James Crawford, Orlando, FL (US); Ni-Bin Chang, Winter Springs, FL (US)

(73) Assignee: University of Central Florida Research Foundation, inc., Orlando, FL (US)

( * ) Notice: Subject to any disclaimer, the term of this patent is extended or adjusted under 35 U.S.C. 154(b) by 453 days.

(21) Appl. No.: 14/829,178

(22) Filed: Aug. 18, 2015

(65) Prior Publication Data

US 2016/0047682 A1    Feb. 18, 2016

Related U.S. Application Data

(60) Provisional application No. 62/038,701, filed on Aug. 18, 2014.

(51) Int. Cl.
*G01F 1/708* (2006.01)
*G01F 1/704* (2006.01)
*G01F 25/00* (2006.01)

(52) U.S. Cl.
CPC .......... *G01F 1/7088* (2013.01); *G01F 1/7046* (2013.01); *G01F 25/0023* (2013.01)

(58) Field of Classification Search
CPC .. G01F 1/70888; G01F 1/7046; G01F 1/7048; G01F 25/0023; G01F 1/7088
See application file for complete search history.

(56) References Cited

U.S. PATENT DOCUMENTS

| | | | |
|---|---|---|---|
| 6,227,045 B1 * | 5/2001 | Morse | E21B 47/1005 166/264 |
| 6,393,925 B1 * | 5/2002 | Devlin | G01F 1/7088 73/861.05 |
| 7,987,709 B2 * | 8/2011 | Barre | G01P 5/10 73/204.11 |

(Continued)

OTHER PUBLICATIONS

Jury, W.A., Roth, K., Transfer Functions and Solute Movement through Soil, Theory and Applications, Birkhauser Verlag, 1990, pp. 106-121.

(Continued)

*Primary Examiner* — Matthew G Marini
(74) *Attorney, Agent, or Firm* — Stephen C. Thomas; Courtney M Dunn

(57) ABSTRACT

An Automatic Pulse Tracer Velocimeter (APTV) including arc-type APTVs and cross-type APTVs along with a field station and a master station capable of wireless communication with a remote computing devices. The APTV measures flow velocity in a flowable medium by injecting a small amount of a conductive tracer solution into a water column. Following injection, a plurality of wire detector pairs positioned downstream of the injection point are programmed to continuously make conductivity measurements at pre-determined time intervals. A tracer curve of the conductivity measurements over time is created and used to obtain velocity measurements.

8 Claims, 20 Drawing Sheets

(56) References Cited

U.S. PATENT DOCUMENTS

2003/0085034 A1* 5/2003 Wellington ............ C09K 8/592
166/248

OTHER PUBLICATIONS

Scheidt, D.J., Flora, M.D., Walker, D.R., Wetlands: Concerns and Successes, Water Quality management for Everglades National Park, 1989; pp. 377-390.
Valocchi, A.J., Water Resources Research, Effect of Radial Flow on Deviations from Local Equilibrium During Sorbing Solute Transport Through Homogeneous Soils., Nov. 1986; vol. 22 (12); pp. 1693-1701.
Nepf H.M. Drag, turbulence, and diffusion in flow through emergent vegetation. Water Resources Research, Feb. 1999;vol. 35(2); pp. 479-489, Cambridge, Massachusetts.
Nixon S. W., Between coastal marshes and coastal waters—a review of twenty years of speculation and research on the role of salt marshes in estuarine productivity and water chemistry. Estuarine Wetland Processes 1980; pp. 438-525.
Barko JW., Gunnison, D., Carpenter, S.R., Sediment interactions with submersed macrophyte growth and community dynamics. Aquatic Botany 1991; vol. 4; pp. 41-65., Elsevier Science Publishers B.V., Amsterdam.
Orson R, Simpson R, Good R., A mechanism for the accumulation and retention of heavy metals in tidal fresh water marshes of the Upper Delaware River estuary., Estuarine Coastal and Shelf Science 1992; vol. 34; pp. 171-186.
Lee C.K., Low K.S., Hew N.S., Accumulation of arsenic by aquatic plants. The Science of the Total Environment, 1991; 103;215-27., Elsevier Science Publishers B.V., Amsterdam.
Phillips D, Jonathan., Fluvial Sediment storage in wetlands., Water Resources Bulletin, Aug. 1989;25;867-72.
Water Survey of Canada Test Plan and Report, Comparison measurements between Sontek Flow-tracker acoustic Doppler velocimeter and price current meters. Water Survey of Canada test plan and report; Aug. 2006, p. 1-25.
Ball, M.H., Schaffranek, R.W., Flow Velocities in Wetlands Adjacent to Canal C-111 in South Florida., US Geological Survey open file report; 2000; p. 00-56.
Gerould, S., Higer, A., U.S. Geological Survey Program on the South Florida Ecosystem—Proceedings of South Florida Restoration Science Forum., May 17-19, 1999, Boca Raton, Florida.
Schaffreneck R.W., Hydrologic Studies in Support of South Florida Ecosystem Restoration. WRPMD 1999:1-8.
Lee JK, Carter V .Field measurement of flow resistance in the Florida Everglades. US Geological Survey open file report; 1999: p. 99-181., (Published as U.S. Geological Survey Fact Sheet FS-061-99).
Genereux D., Slater E., Water exchange between canals and surrounding aquifer and wetlands in the Southern Everglades, USA., Journal of Hydrology 1999; 219:153-68.
Vermeyen B. Tracy., Acoustic Doppler velocity measurements collected near a municipal water intake, Lake Mead, Nevada-Arizona. In: Proc. of the IEEE/OES seventh working conference on current measurement technology; 2003.
Guerrero M, Szupiany R.N., Latosinski F., Multi-frequency acoustics for suspended sediment studies: an application in the Parana River., Journal of Hydraulic Research 2013;51(6):696-707.
Williamson C.H.K., The natural and forced formation of spot-like vortex dislocations in the transition of a wake., J Fluid Mech., 1992;243:393-441., Printed in Great Britain.
Nepf H.M., Sullivan J.A., Zavistoski R.A. A model for Diffusion within emergent vegetation,. Liminol Oceanogr., 1997; 42(8):85-95. Published in 1991 by the American Society of Limnology and Oceanography, Inc.
Bokainan A., Geoola, F., Wake-induced galloping of two interfering circular cylinders., J Fluid Mech 1984; 146:383-415., Printed in Great Britain.
Blevins R.D., Flow-induced vibration., Krieger; 1994. Krieger Publishing Company, Malabar, FL 2001.
Lee J. K., Roig L.C., Jenter H.L., Visser H.M., Drag coefficients for modeling flow through emergent vegetation in the Florida Everglades. Ecological Engineering 2004; 22:237-48.
Fischer H.B., List E.J., Koh R.C.Y., Imberge J, Brooks N.H., Mixing in Inland and Coastal Waters, San Diego, CA: Academic Press Inc., 1979.
Nepf H.M., Vivoni E.R., Flow structure in depth-limited, vegetated flow., Journal of Geophysical Research, 2000; 105(c12):28,547-57, Dec. 15, 2000.
Kovacic D.A., David M.B., Gentry L.E., Starks K.M., Cooke R.A. Effectiveness of Constructed Wetlands in Reducing Nitrogen and Phosphorus Export from Agricultural Tile Drainage., Journal of Environmental Quality, Jul./Aug. 2000; 29(4):1262-74.
Hupp, C.R., Bazemore D.E., Temporal and spatial patterns of wetland sedimentation, West Tennessee. Journal of Hydrology, 1993;141(1-4):179-96., Elsevier Science Publishers B.V., Amsterdam.
Scholes L., Shutes R.B.E., Revitt D.M., Forshaw M., Purchase D., The treatment of metals in urban runoff by constructed wetlands., The Science of the Total Environment 1998; 214(1-3):211-9.
Schaffranek R.W., Riscassi A.L., Sheet flow in Vegetated Wetlands of the Everglades., US Geological Survey, National Center, Reston, VA., Sep. 4, 2013.
Lightbody A.F., Nepf H.M., Prediction of Velocity Profiles and Longitudinal Dispersion in Emergent Salt Marsh Vegetation. Limnol Oceanogr. 2006; 51(1);218-28.
Chanson H., Trevethan, M., Aoki, S., Acoustic Doppler velocimetry (ADV) in small estuary: Field experience and signal post-processing, Flow Measurement and Instrumentation, 2008;19:307-13.
Nikora V.I., Goring D.G., ADV Measurements of Turbulence: Can We Improve their Interpretation? Journal of Hydraulic Engineering, ASCE1998; 124(6):630-4.
McLelland S.J., Nicholas A.P., A new method for evaluating errors in high-frequency ADV measurements., Hydrological Processes, 2000; 14:351-66.
Huang Y.H., Saiers JE, Harvey J, Noe G, Mylon S. Advection, dispersion and filtration of fine particles within emergent vegetation of the Florida Everglades, water Resources Research, 2008; 44:1-13.
Riscassi, A.L., Schaffranek, R.W., United States Geological Survey. Flow Velocity, Water Temperature, and Conductivity in Shark River Slough, Everglades National Park, Florida: Jun. 2002-Jul. 2003.
Rehmel M., Application of Acoustic Doppler Velocimeters for Streamflow Measurements. Journal of Hydraulic Engineering 2007;133;1433-8.
Irish J.D., Plueddemann A. J., Lentz, S.J., In-situ Comparisons or Moored Acoustic Doppler Profilers with Conventional VACM and VMCM current meters. In: Proc of the IEEE fifth working conference on current measurement; 1995. Woods Hold Oceanographic Institution.
Maloszewski P, Benischke R, Harum T, Zojer H. Estimation of solute transport parameters in heterogen ground water system of a karstic aquifer using artificial tracer experiments. Water down under 94; ground water papers; preprints of papers 1994;105.
Pang L., Close M., Noonan M., Rhodamine WT and *Bacillus subtilis* transport through an alluvial gravel aquifer., Ground Water 1998; 36(1);112-22.
Yu C., Warrick A.W., Conklin M.H. A moment method for analyzing breakthrough curves of step inputs., Water Resources Research, 1999; 35(11); 3567-72.
Valocchi A.J., Validity of the local Equilibrium Assumption for Modeling Sorbing Solute Transport Through Homogenous soils., Water Resources Research, 1985; 21 (6);808-20.
Labaky, W., Devlin J.F., Gillham R.W., Field Comparison of the Point Velocity probe with Other Groundwater Velocity Measurement Methods, Water Resources Research, vol. 45.
Weihermüller L., Kasteel R., Vanderborght J., Šimunek J., Vereecken H., Uncertainty in Pesticide Monitoring Using Suction Cups: Evidence from Numerical Simulations., Vadose Zone Journal 2011;10(4);1287-98.

(56) References Cited

OTHER PUBLICATIONS

South Florida Water Management District (SFWMD), http://my.sfwmd.gov/portal/page/portal/xweb%20protecting%20and%20restoring/water%20quality%20stormwater%20treatment%20areas (accessed May 2013), Downloaded Nov. 16, 2015.

Nepf H., Ghisalberti M., Flow and transport in channels with submerged vegetation., Acta Geophysica 2008;56 (3);753-77.

Espinoza, C., Valocchi, A.J., 1998, Temporal Moments Analysis of Transport in Chemically Heterogeneous Porous Media. Journal of Hydrologic Engineering, 3 (4), 276-284, (1998).

Leij, F.J., Dane, J.H., 1992. Moment method applied to solute transport with binary and ternary exchange., Soil Sci. Soc. Am. J. 56 (3), 667-674. (1992).

Young, D.F., Ball, W.P., 2000. Column experimental design requirements for estimating model parameters from temporal moments under nonequilibrium conditions., Advances in Water Resources. 23, 449-460.

Bayless E. R., W. Mandell, J. URSIC, 2011. Accuracy of flowmeters measuring horizontal groundwater flow in an unconsolidated aquifer simulator., Groundwater Water Monitoring & Remediation, 31(2), 48-62.

Chimney M. J., Goforth, G., 2006. History and description of the Everglades nutrient removal project, a subtropical constructed wetland in south Florida (USA). Journal of Ecological Engineering, 27, 268-278.

Devlin J. F., Tsoflias G., McGlashan, M., and Schillig P., 2009. An inexpensive multilevel array of sensors for direct ground water velocity measurement., Ground Water Monitoring & Remediation 29, No. 2, 73-77.

Devlin J. F., Schillig P. C., Bowen I., C. E., Critchley, D. L. Rudolph, N. R. Thomson, G. P. Tsoflias, and J. A. Roberts, 2012. Applications and implications of direct groundwater velocity measurement at the centimetre scale., Journal of contaminant hydrology 127, No. 1, 3-14.

Hatfield K., Annable M., Cho J., Rao P.S.C., Klammler, H., 2004. A direct passive method for measuring water and contaminant fluxes in porous media. Journal of Contamination Hydrology, 75, 155-181.

Kerfoot W. B., 1994. Independent verification of heat pulse groundwater flowmeter results through long term observation and tracer tests on superfund sites., Hydrocarbon Contaminated Soils, 5, 37-49.

Kerfoot W. B., Massard, V.A., 1985. Monitoring well screen influences on direct flowmeter measurements., Ground Water Monitoring and Remediation, 5(4), 74-77.

Kempf A., Divine, C.E., Leone G., Holland S., Mikac J., 2013. Field performance of point velocity probes at a tidally influenced site., Remediation Journal 23, No. 1 37-61.

McCormick, P.V., S. Newman, S. Miao, D.E. Gawlick, D. Marley, K.R. Reddy, T.D. Fontaine, 2002. Effects of anthropogenic phosphorus inputs on the Everglades. In: Porter, J.W.

Ivanoff, D., Pietro, K., Chen, H., Gerry, L. Performance and Optimization of the Everglades Stormwater Treatment Areas. 2012 South Florida Enivironmental Report, Chap 5.

Swift D. R., R. B. Nicholas, 1987. Periphyton and water quality relationships in the Everglades Water Conservation Areas. Tech Pub. 87-2, South Florida Water Management Distr.

Assi, G. Wake-induced vibration of tandem and staggered cylinders with two degrees of freedom. Journal of Fluids and Structures, 2014.

Labaky W., Devlin, J. F., Gillham, R. W., Probe for measuring groundwater velocity at the centimeter scale, Environmental science & technology 41, No. 24, 8453-8458, 2007.

* cited by examiner

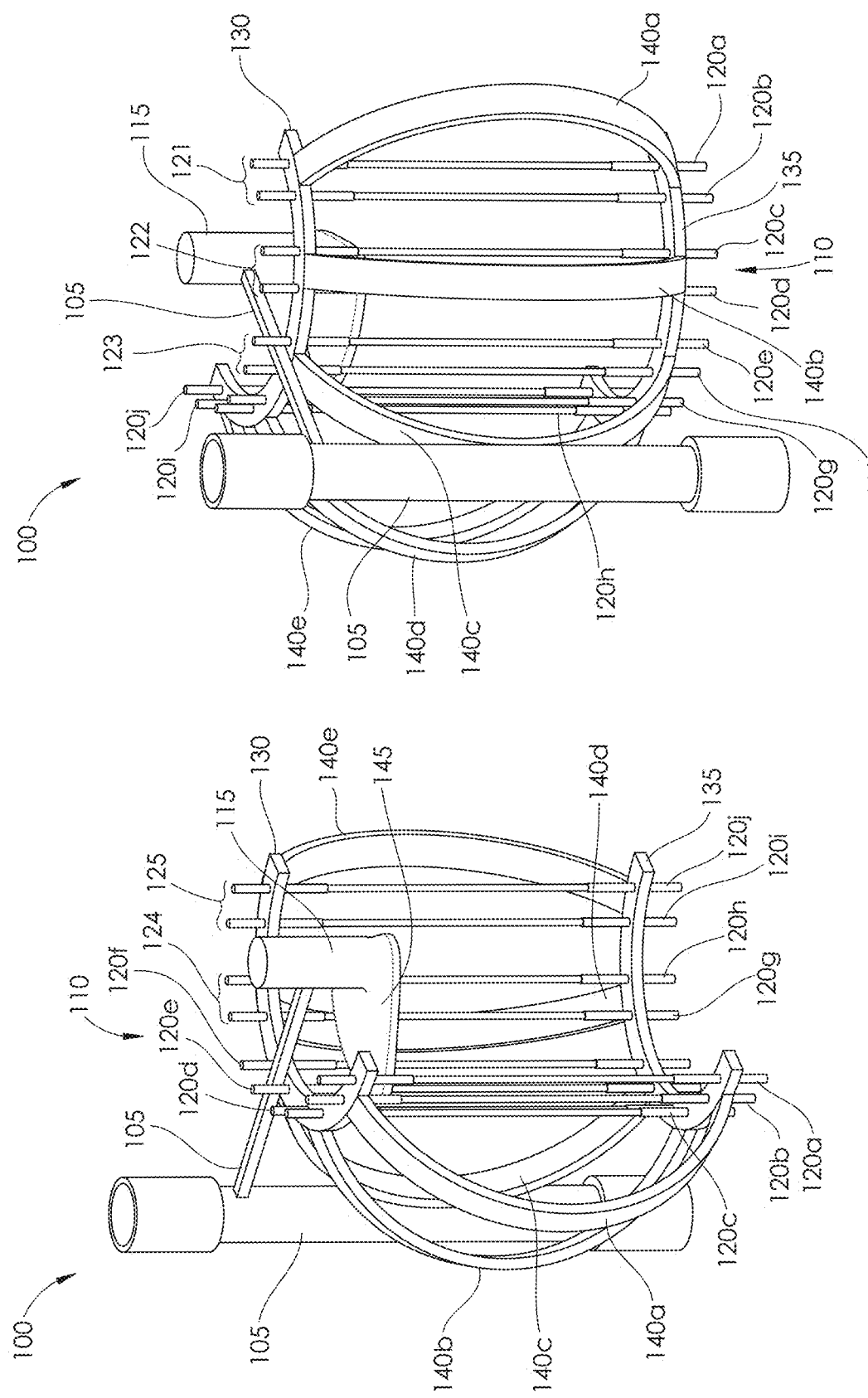

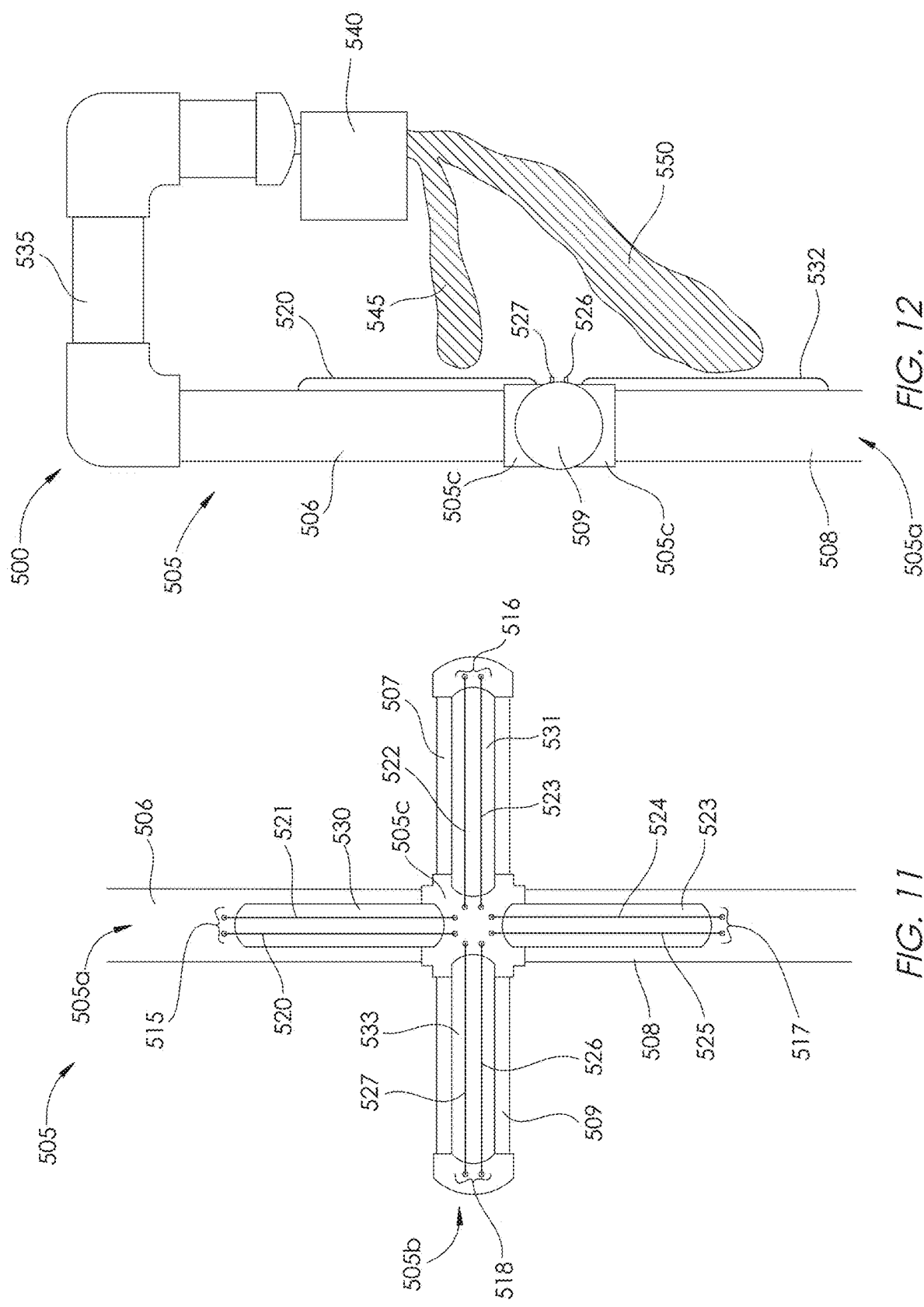

| APTV orientation | Theoretical | Measured | Difference |
|---|---|---|---|
| Left 75° | −75 | −75.00 | 0° |
| Left 56° | −56 | −51.00 | +5° |
| Left 37° | −37 | −37.00 | 0° |
| Left 18° | −18 | −13.00 | +5° |
| Center 0° | 0 | 0.00 | 0° |
| Right 18° | 18 | 25.00 | +7° |
| Right 37° | 37 | 37.00 | 0° |
| Right 56° | 56 | 46.00 | −10° |
| Right 75° | 75 | 75.00 | 0° |

| Statistical parameter | NAV | SAV | EAV | MAV |
|---|---|---|---|---|
| R-square | 0.997 | 0.991 | 0.988 | 0.988 |
| RMSE (cm s$^{-1}$) | 0.601 | 0.668 | 0.936 | 0.909 |
| PE (%) | 16.740 | 24.350 | 33.390 | 32.660 |
| RSD | 0.930 | 0.835 | 0.670 | 0.676 |

| Scenario | RMSE (cm s$^{-1}$) | PE (%) | RSD |
|---|---|---|---|
| SAV | 0.603 | 26.351 | 0.909 |
| EAV | 0.716 | 39.801 | 0.764 |
| MAV | 1.294 | 35.565 | 0.526 |
| NAV | 0.829 | 18.927 | 0.799 |

AUTOMATIC PULSE TRACER VELOCIMETER

CROSS REFERENCE TO RELATED APPLICATIONS

This application claims priority to U.S. Provisional Patent application No. 62/038,701, filed Aug. 18, 2014, entitled "Automatic Pulse Tracer Velocimeter," which is hereby incorporated by reference herein in its entirety.

FIELD OF INVENTION

The present disclosure generally relates to velocimetry; more specifically, velocimeters for use in heterogeneous aquatic environment to measure low velocity flow rates.

BACKGROUND

Understanding low flow velocities is an important challenge in characterizing the fate and transport of contaminants in wetlands, stormwater ponds, streams, coastal bays/estuaries and groundwater environments. By capturing the velocity with the aid of various sensors, progress has been made in calculating drag coefficients, diffusivity and turbulence as well as understanding the transport of nutrients and other contaminants. Furthermore, measuring velocities in heterogeneous field environments, such as constructed wetlands with multiple vegetation types, helps deepen the knowledge of the effects wind, stage and precipitation may have on the fluid motions of the system, thereby ultimately leading to better system planning, design and operation to promote efficiency in pollutant removal. In many instances these environments are dominated by low range velocities regimes (<5 cm·sec$^{-1}$) characteristic of directionally variable flows and shallow depths (<15 cm), making field velocity measurements difficult without the use of expensive equipment. The development of techniques that better characterize such local-scale temporal and spatial variations in velocity and direction are particularly valuable.

Currently, few technologies exist capable of measuring the low heterogeneous velocities commonly found in wetlands and Stormwater Treatment Areas (STAs). Inexpensive current meters utilizing mechanical propellers have been found useful at higher flow rates, but begin to become infeasible at flows less than 6 cm·sec$^{-1}$. Acoustic Doppler Velocimeters (ADV) and Acoustic Doppler Current Profilers (ADCP) have found popularity in wetland applications and have been shown to measure down to 0.02 cm·sec$^{-1}$ in the Florida Everglades; however, they come with inherent drawbacks including depth limitations, single point volume locations, Doppler noise, signal aliasing and high costs. ADCPs have been found to operate effectively to produce current profiles in oceans, canals and rivers, but become infeasible in shallow water applications due to side lobe interference and blanking distances. With few devices available on the market, there exists a need for a cost-effective, reliable alternative for capturing low flow, directionally variable velocities.

Wetland and estuary marshes provide an important role for environmental ecosystems. The dense vegetation commonly found in these environments serve to facilitate nutrient cycling, enhance sedimentation of suspended solids, create barriers for storm surge protection and provide protective habitats for aquatic species. Through hydrodynamic processes, wetlands and marshes have been shown as effective treatment methods in reducing several pollutants from surface waters including phosphorus, suspended solids and metals. Several studies have been conducted in these environments to further characterize various fluid motion properties.

Flow velocities in the Florida Everglades have generally been recorded within a 0.0 to 3.5 cm·sec$^{-1}$ range, while flow velocities in estuaries have been recorded as ranging from 0 to 28 cm·sec$^{-1}$. Velocities within wetlands and marshes typically follow a spatially heterogeneous nature which may have several explanationis. The velocity heterogeneity is due to both stem-scale dispersive effects caused by velocity depressions just downstream of vegetative stems, as well as depth-scale shear dispersion effects. In addition, with sufficient low velocities and shallow water depths, wind effects may also play a role in velocity direction. Due to these factors, the velocity fields within wetlands and estuaries may vary widely on a temporal, vertical and lateral scale, and any device used to measure them should be able to account for fluctuations in both direction and magnitude. As a result wetlands have been shown to be challenging environments for velocity measurements.

Acoustic Doppler technology has been shown to work effectively in wetlands; however, it comes with some limitations. ADVs operate by measuring the Doppler shift produced when an acoustic pulse is reflected off of suspended particles moving in the water. For ADVs, the sampling volume is a "single point" approximately 0.25 cm$^3$ located about 7 cm from the sensor, whereas for ADCPs several sampling volumes are produced sometimes measuring hundreds of meters in length from the device. Although ADVs are robust and capable of high sampling frequencies, several researchers have reported issues while operating in field environments including high levels of noise and spikes in the velocity components, signal interferences caused by velocity shear and boundary proximity and disturbances from other Doppler signals or passing boats. Obviously, ADVs have a limitation in measuring a single point, making velocity profiling only possible by physically moving the device to specific height increments. The ADCP is excellent at vertical velocity profiling; however, it becomes ineffective in shallow waters due to blanking distances and side lobe interferences. The ADCP may also be used for horizontal profiling; however, this application is limited to deeper waters such as canals and lakes.

In addition, some studies have shown difficulties in producing precise measurements for regions of wetlands. In establishing dispersive properties in the Everglades, an attempt was made to use an ADV to establish velocity profiles along a 4.8 meter stretch, but it was found that the device was insufficient due to lateral changes in the vertical velocity profile. With such heterogeneous natures, clearly single point measurements or single vertical profiles are not sufficient to fully characterize velocity fluid motions in wetlands and estuary environments, and without sufficient data, conclusions can only be made on a broad scale.

Interactions between groundwater and surface water may play a significant role in the fields of subsurface ecology, biogeochemistry, sediment quality, solute transport and remediation. Proper knowledge of water flux rates at the interface between groundwater and surface water is key in understanding and developing remediation techniques for ground or surface water treatment. Traditional methods for calculating fluxes have relied on calculations using Darcy's Law; however, they are heavily dependent on assumptions made including soil type, permeability rates and hydraulic gradients. In response, several devices have been developed to capture groundwater velocities at centimeter-scales including the Heat Pulse Flow Meters (HPFM), Point Velocity Probe (PVP), and Passive Flux Meter (PFM).

Heat Pulse Meters (HPMs) have been used for more than 20 years in estimating groundwater velocities. HPMs estimate groundwater velocity and direction by measuring the arrival and decay of a heated plume as it travels through the subsurface environment by use of thermistors surrounded by glass beads. While HPMs have been found to give accurate estimates of groundwater velocities careful attention is required to ensure proper drilling methods, well and annular size and probe placement are used. PFMs are relatively new devices which operate by installing a nylon mesh tube filled with a sorbent media and tracer mixture into a well. As groundwater flows through the media, the tracer de-sorbs at a rate proportional to the groundwater flux. Because the tracer concentrations cannot be measured until the media is pulled from the well, the method only produces time-averaged flux rates. PVPs operate by injection of a saline solution out the side of a PVC tube installed in the in-situ soil. Conductivity detectors are placed on the side of the PVC tube to measure the passing pulse (conductivity measurements over time), thereby creating a tracer curve. Using equations for flow around a cylinder, the velocity measurements are imperially derived from the tracer curve. The PVP has been shown to be effective; however, it is limited to sandy soil types and requires careful installation procedures.

SUMMARY

In accordance with the teachings disclosed herein, embodiments related to an automatic pulse tracer velocimeter (APTV) is disclosed.

In a first embodiment, an arc-type APTV comprises a detector frame, a plurality of detector wire pairs, a support frame and an injection port. The detector frame includes a bottom portion, a top portion and a side portion connecting the bottom portion and the top portion. The plurality of detector wire pairs is connected to the detector frame top portion and the detector frame bottom portion. The detector wire pairs are distributed at approximately equal distances from each other along the detector frame top portion and bottom portion. The support frame is connected to the detector frame. The injection port may be connected to the support frame and positioned approximately equidistant from each of the plurality of detector wire pairs.

In a second embodiment, the cross-type APTV comprises a detector frame, four detector wire pairs, a support frame and an injection port. The detector frame comprises a vertical portion having a top portion and a bottom portion, a horizontal portion having a left portion and a right portion and a central portion. The vertical portion and horizontal portion are connected at the central portion to form a cross shape. The top portion of the vertical portion has a first opening there through, the bottom portion of the vertical portion has a second opening there through, the left portion of the horizontal portion has a third opening there through and the right portion of the horizontal portion has a fourth opening there through. The first detector wire pair is connected to the top portion of the vertical portion of the detector frame and to the central portion and the first detector wire pair is at least partially suspended over the first opening. The second detector wire pair is connected to the bottom portion of the vertical portion of the detector frame and to the central portion and the second detector wire pair is at least partially suspended over the second opening. The third detector wire pair is connected to the left portion of the horizontal portion of the detector frame and to the central portion and the third detector wire pair is at least partially suspended over the third opening. The fourth detector wire pair is connected to the right portion of the horizontal portion of the detector frame and to the central portion and the fourth detector wire pair is at least partially suspended over the fourth opening.

The support frame connects to the detector frame at an end of the top portion of the vertical portion. The support frame also connects with an injection port, which is positioned about parallel to the vertical portion of the detector frame and at a predetermined distance from the third and fourth detector wire pairs.

In a further embodiment, the APTV field station comprises an APTV, a pump in fluid communication with the APTV, a tracer reservoir in fluid communication with the pump, a data logger in communication with the APTV and the pump, a transmitter in communication with the data logger, and a power source in electrical communication with the pump and the data logger.

BRIEF DESCRIPTION OF THE DRAWINGS

FIGS. 1 and 2 are perspective views of an arc-type APTV according to an embodiment of the present invention.

FIG. 11 is a front elevational view of a cross-type APTV according to an embodiment of the present invention.

FIG. 12 is a side elevational view of the cross-type APTV of FIG. 11.

DETAILED DESCRIPTION OF THE EMBODIMENTS

Figure 4:
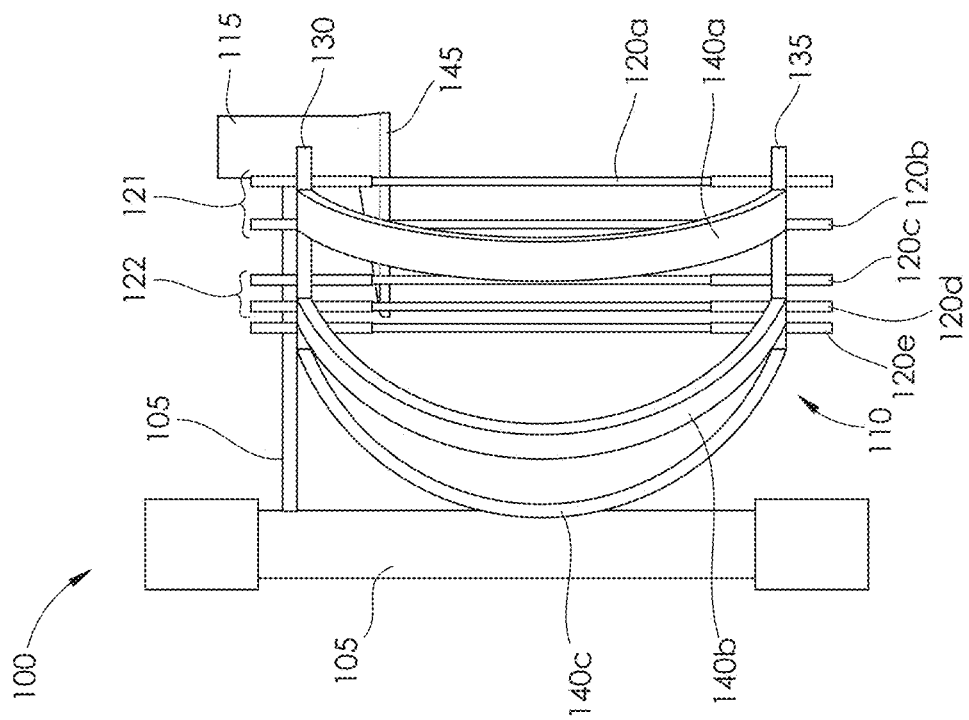
FIG. 4 is a side elevational view of the arc-type APTV of FIGS. 1 and 2.
Figure 3:
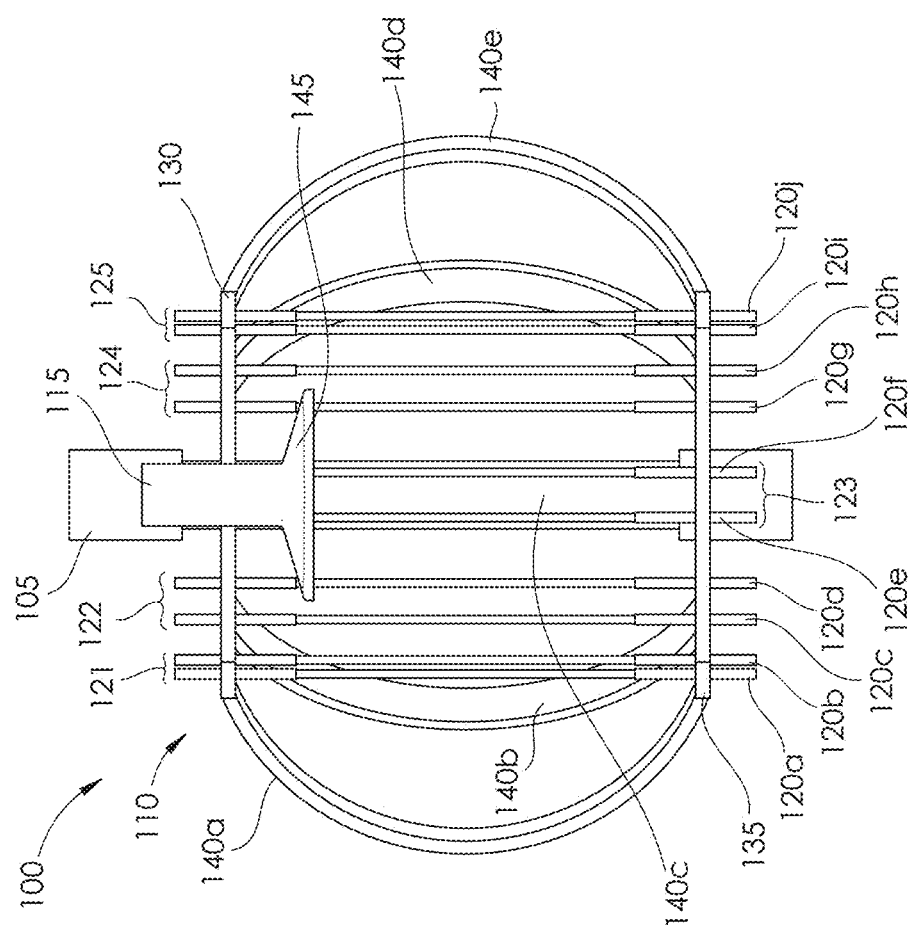
FIG. 3 is a front elevational view of the arc-type APTV of FIGS. 1 and 2.

A detailed description of embodiments of an automatic pulse tracer velocimeter (APTV) and related methods will now be presented with reference to FIGS. 1-43. One of skill in the art will recognize that these embodiments are not intended to be limitations on the scope, and that modifications are possible without departing from the spirit thereof. In certain instances, well-known methods, procedures, components, and circuits have not been described in detail.

It is to be understood that while the description of the invention is directed to measuring water velocities, for clarity sake, embodiments of the invention may be used to measure velocity of any flowable medium. Thus, in the description of embodiments of the invention, "water" or "medium" shall mean any flowable medium.

Embodiments of the APTV measure flow velocity by injecting a small volume of a conductive tracer solution into a water column. The conductive tracer solution can be any solution that measurably affects the conductivity of the medium to be measured, which for fresh water applications may be, for example, saline. Following injection of the tracer, the conductivity of the water is measured by one or more conductivity detectors positioned downstream of the injection point and recorded at pre-determined time intervals. The conductivity detectors may be any conductor, such as, for example, insulation-stripped copper wire pairs. The positioning of the conductivity detectors, including an arcuate or arc shape and a cross shape are described in detail below. A tracer curve of the conductivity measurements over time is created from the recorded information and used to obtain velocity, directional and dispersion components. To do this, conductivity measurements may be taken at the conductivity detectors at pre-determined time intervals (for example, every 500 μsec). Embodiments of the APTV may be used for measuring low range water velocities in heterogeneous aquatic environments, such constructed wetlands, coastal marshes, lakes and reservoirs. Embodiments of the APTV may measure flow velocities within a range of about 0.2 cm·sec$^{-1}$ to about 5.0 cm·sec$^{-1}$. Both an arc-type and cross-type APTVs are described below.

In an embodiment, illustrated in FIGS. 1-4, arc-type APTV 100 comprises support frame 105, detector frame 110, injection port 115 and plurality of detector wires 120a-120j paired together to form a plurality of detector wire pairs 121-125.

Support frame 105 is connected to detector frame 110 and can aid in suspension of APTV 100 from a larger support structure (not shown) or secure it to a pole (not shown) or other support structure that has been secured to the floor of the waterway. Support frame 105 may, for example, be fabricated from ¾-inch schedule 40 PVC pipe.

Detector frame 110 comprises frame top portion 130, frame bottom portion 135, and a frame side portion, which is comprised of frame side panels 140a-140e. Frame top portion 130 and frame bottom portion 135 are arcuate in shape when viewed from the top. Top frame portion 130 may be parallel or approximately parallel to frame bottom portion 135. Frame side panels 140a-140e are also arcuate in shape and connect frame top portion 130 and frame bottom portion 135. The number, placement, width, and arcuate shape of side panels 140a-140e are exemplary as the frame side portion can be any shape and size that allows frame top portion 130 and frame bottom portion 135 to hold detector wire pairs 121-125 in place and provides one or more openings for water to flow through. Detector frame 110 may be, for example, fabricated from plastic material using a three-dimensional (3D) printer.

Detector wires 120a-120j may be insulated wires with a portion of the insulation stripped. As shown in FIGS. 1-4, a central portion of each of detector wires 120a-120j is stripped leaving insulation at both ends of each of detector wires 120a-120j and exposing the conductor thereof to the water. For example, each of detector wires 120a-120j may have about a 12.7 cm portion stripped of insulation. Detector wires 120a-120j are connected at a first insulated area to frame top portion 130 and at a second insulated area to frame bottom portion 135. Detector wires 120a-120j may be positioned in apertures in frame top portion 130 and frame bottom portion 135. Such an arrangement allows for easy connection to electrical wiring (not shown) that connects to a monitoring station (not shown) or data logger (not shown). As used herein, "data logger" means any electronic device that is capable of recording data over time. As shown, detector wires 120a-120j may be set apart and arranged in an arcuate pattern as viewed from above. The conductors of detector wires 120a-120j may be, for example, copper wire; however, the conductors may comprise any conductive material. Detector wires 120a-120j may be any gauge or diameter. Although shown in this embodiment to be pairs of detector wires, other conductivity detectors may be used.

Figure 5:
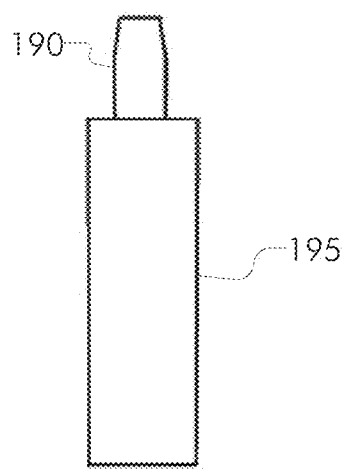
FIG. 5 is a front elevational view of an exemplary diffuser stone according to an embodiment of the present invention.

Injection port 115 is connected to support frame 105 and has a tracer outlet (not shown) that releases conductive tracer solution. Alternatively, injection port 115 may be connected to detector frame 110. Injection port 115 is positioned on the side of detector frame 110 opposite frame side panels 140a-140e; however, all or a portion of injector port 115 may be above frame top portion 130. Tracer outlet may be positioned about equidistant from each of detector wire pairs 121-125. The distance may vary with the size of detector frame 110 in order to keep detector wire pairs 121-125 at approximately the same distance from injection port 115. As an example, injection port 115 may be placed about 7.6 cm in horizontal distance away from each of detector wire pairs 121-125. As another example, injection port may be placed about 5 cm in horizontal distance away from each of detector wire pairs. Injection port 115 may, but does not necessarily, comprise a small cylindrical diffuser stone (not shown). In an exemplary embodiment, the diffuser stone measures about 0.9 cm in diameter having a length of about 3 cm with a connector piece measuring about 0.87 cm. The top and vertical surfaces of the diffuser stone may be sealed to ensure that the tracer only ejects from the bottom of the stone. This may be done using any sealant but may be, for example, silicone or similar sealant. An exemplary embodiment of a diffuser stone comprising stone 195 and connector 190 is shown in FIG. 5.

Returning to FIGS. 1-4, injection port 115 may have hydrofoil 145 positioned thereon. Turbulent eddies may form behind injection port 115 during higher flows (e.g. >1.5 cm·sec$^{-1}$). Use of hydrofoil 145 is optional. Hydrofoil 145 may reduce the turbulent eddies and smooth out flows below injection port 115. Hydrofoil 145 may be created from any material that is able to structurally withstand the environment without deformation. As an example, the hydrofoil 145 may be made from a plastic material using a 3D printer. A diagram of another exemplary hydrofoil, different from hydrofoil 145 shown in FIGS. 1-4, is provided in FIG. 6 along with exemplary dimensions. Injection port 115 may, as shown here, physically incorporate hydrofoil 145, or hydrofoil 145 may be a separate piece.

Figure 7:
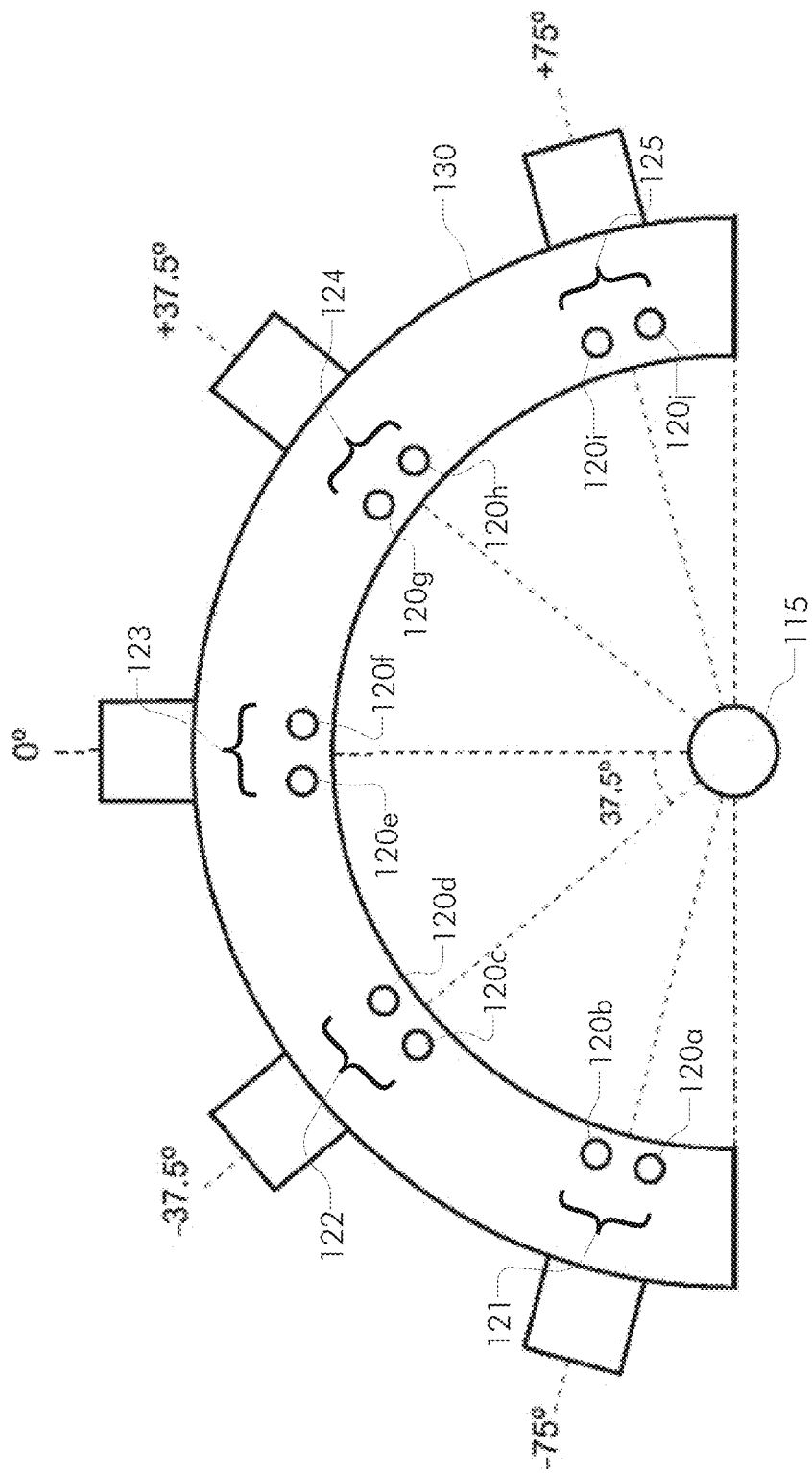
FIG. 7 is a top plan view of an arc-type APTV (with the support frame removed) showing exemplary redial separation of detector wire pairs according to an embodiment of the present invention.

An exemplary arrangement of detector wires 120a-120j along frame top portion 130 in relation to injection port 115 is shown in FIG. 7. As shown, each of detector wire pairs 121-125 are spaced apart approximately 37.5° radially measured from injection port 115. This exemplary arrangement produces a pulse detection range of 180° and adds a y-axis component to produce two-dimensional (2D) directional detection. As shown, from the center line of frame top portion 130 (indicated at 0°), detector wire pairs 121, 122, 123, 124 and 125 are offset approximately −75°, −37.5°, 0°, +37.5° and +75°, respectively. Other spacing of detector wire pairs 121-125 can also be used (for example, about 18°). When closer spacing is used, additional detector wire pairs may be used or the pulse detection range may be reduced.

Embodiments of the arc-type APTV operate by measuring the time for a pulse of conductive tracer solution to travel a pre-determined distance from an injection port to a set of conductivity detectors, which are spaced apart in an arcuate pattern at approximately equal distances from each other. The tracer solution may be any electrolyte tracer solution that aids in conductivity measurements, such as, for example, sodium chloride (or saline) or potassium chloride. Such tracers may have high conductivity (for example, greater than about 20 μOhms·cm$^{-1}$) and low toxicity. Such tracers may also be any material that measurably affects the conductivity of the medium by either raising or lowering the conductivity of the medium. Small pulses (for example, between about 1 ml and about 2 ml) of the conductive tracer are emitted into the water column. The conductivity detectors may be any detector capable of conducting an electric current, such as, for example, insulation-stripped copper wire pairs. By measuring the change in conductivity at the conductivity detectors with time, a tracer pulse curve is generated, which can be used for deriving a velocity component by dividing the distance from the injection port to the conductivity detectors by the time of peak detection. By spacing the detector wire pairs at an approximately equal distance around the injection port at predetermined increments, directional components may also be derived from the tracer curves. This allows a combination of both velocity magnitude and direction of water flow to be computed. With respect to arc-type APTV 100, shown in and described with respect to FIGS. 1-4 above, injection port 115 injects a tracer solution at predetermined intervals (i.e. pulsating pattern). The time that it takes each pulse of tracer solution to reach one or more of detector wire pairs 121-125 is measured and recorded and a tracer pulse curve can be generated therefrom.

Figure 8:
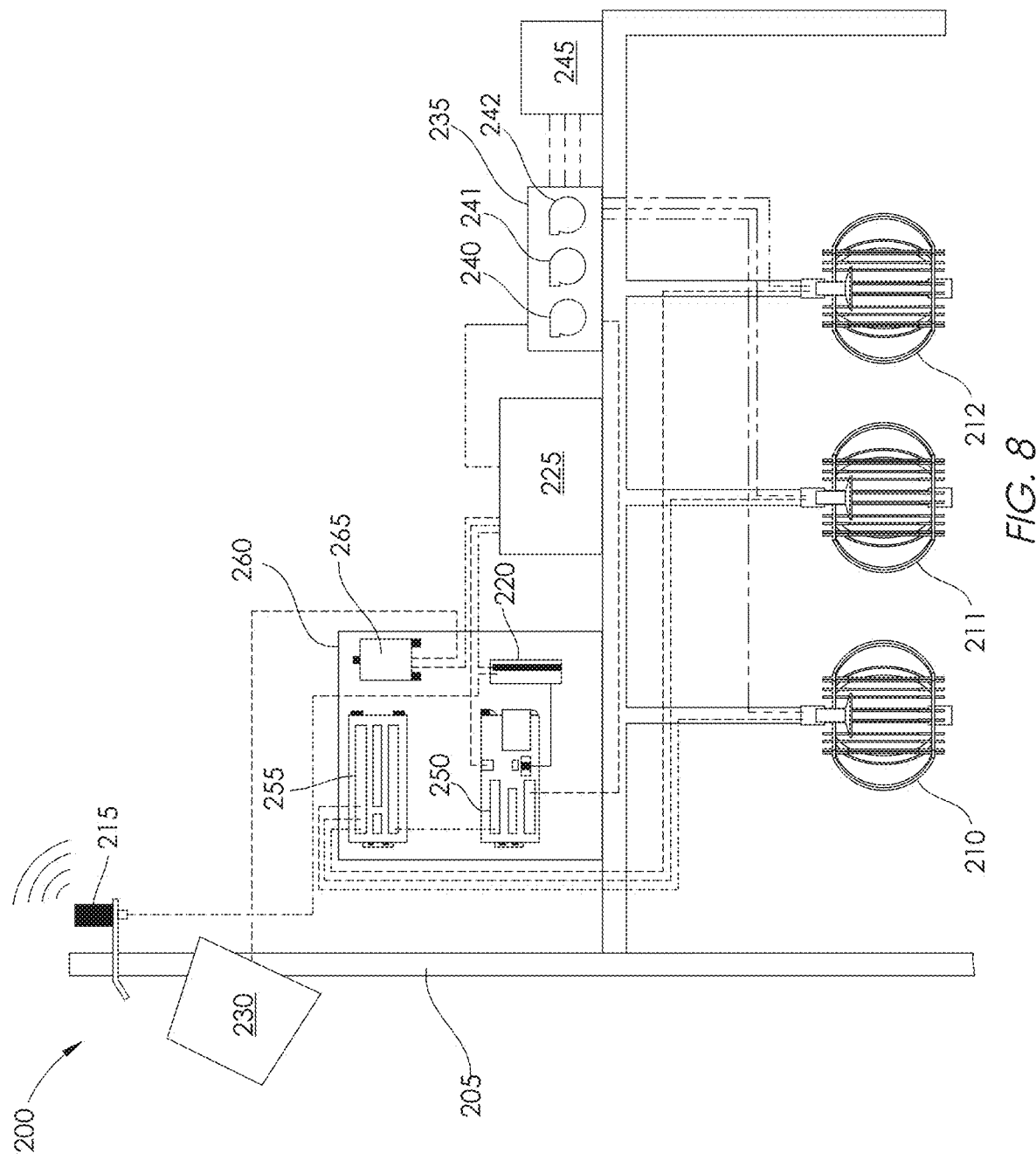
FIG. 8 is a block diagram of an APTV field station system according to an embodiment of the present invention.

In an embodiment, arc-type APTVs are used as part of an APTV field station, which may be deployed in a remote location and operated from a distance. Such APTV stations may provide continuous, remote sampling of water velocities. APTV field station 200 is illustrated in FIG. 8.

APTV field station 200 comprises APTVs 210-212. Although three arc-type APTVs are shown, any number of APTVs or other types of APTVs including cross-type APTVs, as described below, can be used. In addition, more than one type of APTV can be used on any given field station. For example, APTV field station 200 could comprise one or more cross-type APTVs and one or more arc-type APTVs. APTVs may be directly connected and supported by support structure 205 or may be supported by another support structure and may be located remotely from APTV field station 200.

APTV field station 200 may be equipped with transceiver 220 for transmitting data to and from a remote control/monitoring station (not shown). Alternatively, APTV field station 200 may be equipped with only a transmitter in place of transceiver 220. Transceiver 220 may be in wireless communication with a remote computing device (not shown), enabling data to be transmitted between APTV field station 200 and the remote computing device (not shown) by any means known in the art of data transmission. APTV field station may optionally further comprise antenna 215 (such as, for example, a 1 dB omni-directional antenna) in electrical communication with transceiver 220 to boost transmission rates. In this case, antenna 215 (and transceiver 220 through antenna 215) would be in wireless communication with the remote computing device (not shown) through a data network as is known in the art. Although other communication methods may be used, as an example, APTV field station 200 may be equipped to use cellular network data transmission. In this case, transceiver 220 may be a cellular modem. As an example Code Division Multiple Access (CDMA) data transmission may be used. Alternatively, modem 220 can be electrically connected to a computing device located at APTV field station 200 or as remotely as feasible with such a wired connection. The computing device stores and processes the data received from APTV field station 200. Modem 220 is in wired or wireless communication with data logger 250. The computing device may comprise software running thereon that can automatically analyze the tracer pulses to obtain velocity measurements.

Data logger 250 is programmed to take half-bridge measurements through the detector wire pairs of APTVs 210-212. Data logger 250 transmits data (e.g. medium or water conductivity measurements) collected from APTVs 210-212 to modem 220. If the data logger being used is only capable of receiving a single input or a number of inputs that is less than the number of APTVs, a multiplexer may be used to receive input from each of the APTVs. Here, multiplexer 255 is in electrical communication with each of APTVs 210-212 and receives input from each of APTVs 210-212. Multiplexer 255 is in electrical communication with data logger 250 and transmits the data it receives from APTVs 210-212 to data logger 250. Alternatively, if, for example, there was only one APTV, then the APTV could connect directly to data logger 250.

Data logger 250 may also be in electrical communication with pumps 240-242, which may be, for example peristaltic pumps. Pumps 240-242 are in fluid communication (via, for example, tubing) with the injection port of APTVs 210-212. Depending on the pump used, one pump may be used for each APTV or a single pump may be used for multiple APTVs. Pumps 240-242 control the injection of tracer into the water (or other medium) from the injection port of APTVs 210-212. Data logger 250 may be programmed to control pumps 240-242. Pump enclosure box 235 may be used to enclose pumps 240-242.

Tracer solution is stored in tracer reservoir 245. Pumps 240-242 are in fluid communication (via, for example, tubing) with tracer reservoir and pump tracer solution from tracer reservoir 245.

Data logger 250, pumps 240-242, modem 220 are in electrical communication with power source 225, which may be, for example a battery or rechargeable battery. Although the connection is not shown in FIG. 7, multiplexer 255 may also be in electrical communication with power source 225. Power source 225 provides power to such connected components. Optional solar panel 230 may serve as a charge source for power source 225 in which case solar panel 230 may be in electrical communication with charge regulator 265, which regulates the charging of power source 225 and is in electrical communication with power source 225.

Electronics enclosure box 260 may be used to enclose modem 220, charge regulator 260, data logger 250 and any other components than may be damaged by a harsh environment.

Figure 15:
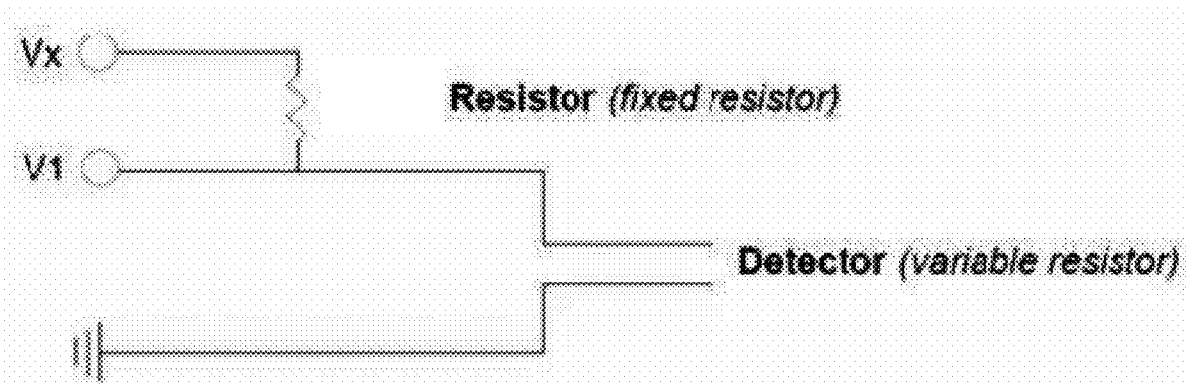
FIG. 15 is block diagram of a circuit for resistance ratio measurements according to an embodiment of the present invention.

In an exemplary embodiment of an arc-type APTV, five 18-gauge insulated copper detector wire pairs are used with approximately 5 cm of the insulation stripped from each copper wire. The detector wires in each of the detector wire pairs are set apart approximately 1 cm; however, other distances, for example, distances between about 0.25 cm and about 2 cm, may be used. The detector wire pairs may be arranged in the arcuate pattern along a 0.75 inch support frame. The wires are routed to and are in electrical communication with a data logger, such as, for example, a Campbell Scientific™ CR1000 data logger, whereby the conductivity of the medium between the detector wires in a detector wire pair is measured by applying a reverse excitation DC current and half bridge voltage measurements are taken using fixed resistors. An exemplary circuit diagram is shown in FIG. 15. An exemplary voltage for the reverse excitation DC current is approximately 2.5 volts and an exemplary resistance for the fixed resistor is approximately 1000 Ohms; however, other excitation values and resistor values may be utilized and are within the scope of the invention. The resistance ratio between the stripped copper wires and the fixed resistors is calculated, normalized, and plotted with time to establish tracer curves. The half bridge voltage measurements may be taken at regular intervals (e.g. every 0.5 seconds) to establish tracer curves of suitable resolution.

Figure 9:
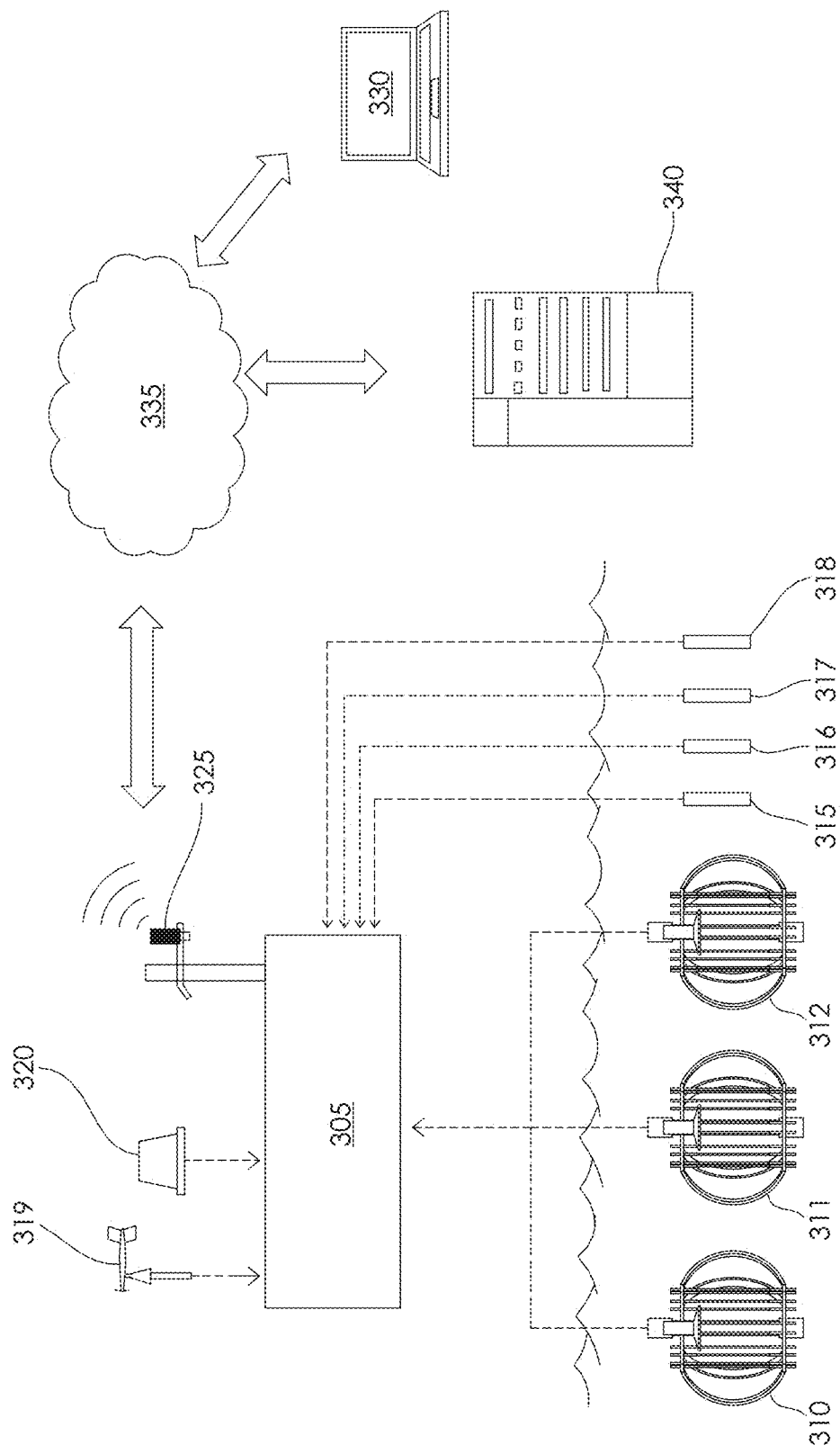
FIG. 9 is a block diagram of an APTV master station and remote control/monitoring system according to an embodiment of the present invention.

As illustrated in FIG. 9, APTV master station 305, which is similar to the APTV field station shown in FIG. 8 and described above, can serve as a base to which an expanded sensing network system can be added. APTV master station 205 may comprise all of the same components as APTV field station 200 (FIG. 8) including antenna 325 and APTVs 310-312. Similar to APTV field station 200, although three arc-type APTVs are shown (i.e. APTVs 310-312), any number of APTVs and other types of APTVs including cross-type APTVs, as described below, can be used. In addition, more than one type of APTV can be used with APTV master station 305. For example, APTV master station 305 could comprise one or more cross-type APTV and one or more arc-type APTV. APTVs 310-312 may be directly connected and supported by the support structure (not shown) of master station 305 or may be supported by another support structure (not shown) and may be located remotely from APTV master station 305. Additional local or remote APTVs can be added to APTV master station 305 by utilizing additional ports on a multiplexer (not shown). The APTVs may be installed along horizontal transects to capture the horizontal velocity profile for a given area. Such data may be valuable for determining areas of water "short circuiting" which may occur within wetland systems due to changes in vegetation density, bathymetry or wind effects. The distance of remote APTVs from APTV master station 305 may only be limited by wire and tracer tubing length.

Sensors 315-320 may also be connected to APTV master station 305. One or more of sensor 315-318 may be, for example, water quality sensors, pressure transducers, turbidity meters, dissolved oxygen (DO) probes, pH probes, oxidation-reduction potential (ORP) probes, or micro-sensors capable of measuring phosphate, ammonia, nitrate and nitrite. Although four sensors are shown in FIG. 9, more or fewer may be used. One or more of sensors 319-320 may be, for example, wind gauges, precipitation gauges or solar radiation gauges. Although two sensor are shown in FIG. 9, more or fewer may be used. Software, such as, for example, Campbell Scientific's LoggerNet™, coupled with a cellular modem (not shown) or other transceiver, may be used to allow remote control of APTV master station 305 over internet 335 using wireless communication (such as, for example, CDMA data transmission) from remote computer 330. Remote control may include, for example, the ability to program pulse tracer injection intervals and tracer injection duration. This may allow a user to remotely increase pulse frequency to obtain more accurate results during turbulent conditions or turn off pulses when measurements are not required. Such conditions may also be automatically detected by one or more of sensors 315-320 or determined data collected from APTVs 310-312 and cause the system to automatically adjust pulse frequency according to the conditions detected. Data center 340 may also be in communication with master station 305 and/or remote computer 330 and may receive and store data from master station 305 and/or remote computer 330.

Figure 10:
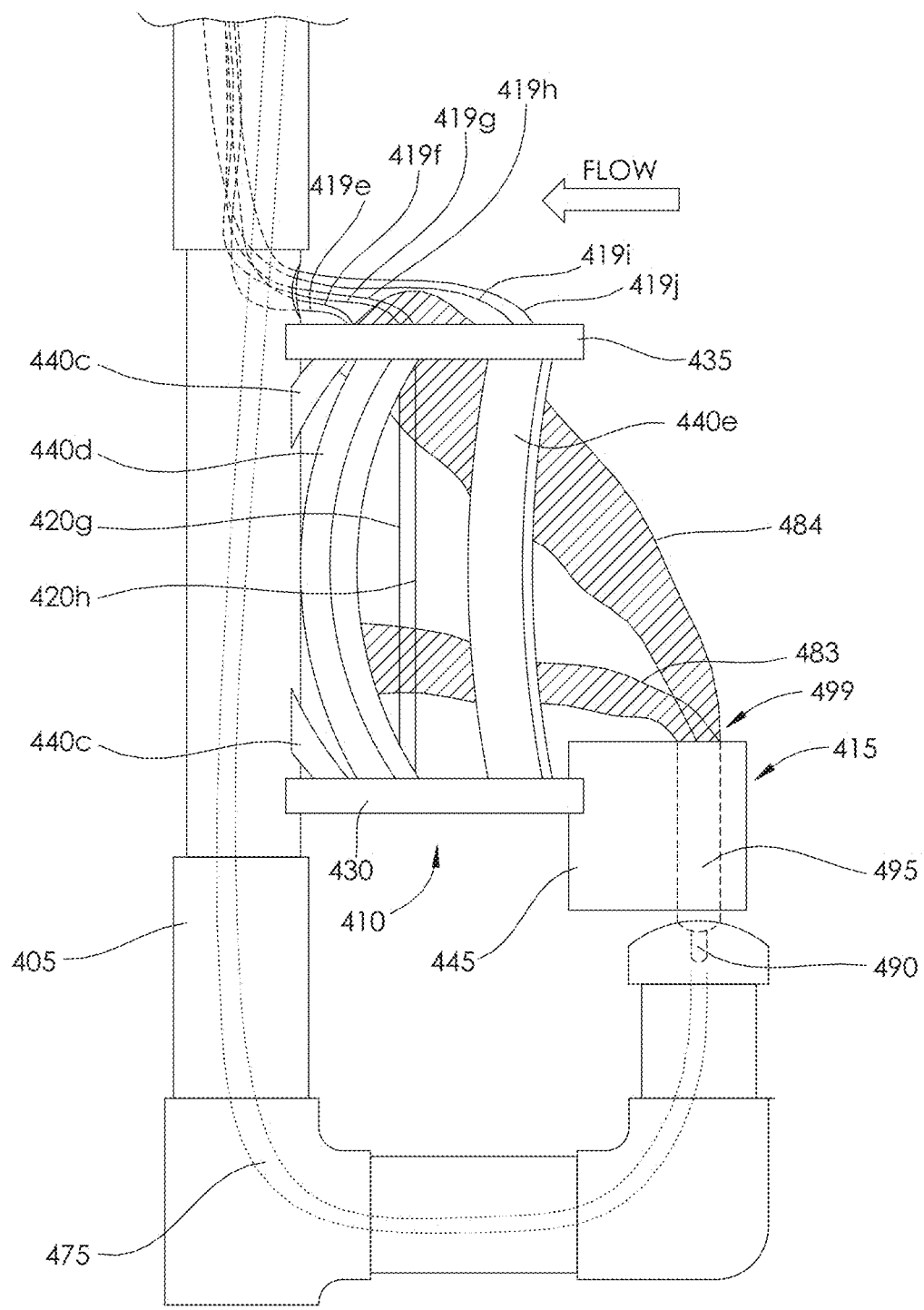
FIG. 10 is a side elevational view of an inverted arc-type APTV according to an embodiment of the present invention.

Salt or saline tracers as discussed herein as an example tracer are generally for freshwater systems. Other tracers can be used in other applications. For example, freshwater or de-ionized water tracers can be used in saline applications, such as, for example, in a saline estuaries. In saline applications, the tracer will be more buoyant than the saline medium, so the APTV may be inverted to capture the tracer pulses released from the injection port. As shown in FIG. 10, inverted APTV 400 comprises support frame 405, detector frame 410, injection port 415 comprising a hydrofoil and diffuser stone 495, and plurality of detector wires 420g-420j paired together to form wire detector pairs. Additional detector wires are present but cannot be seen in this view.

Support frame 405 is connected to detector frame 410 and can aide in suspension of APTV 400 from a larger support structure (not shown) or secure it to a pole (not shown) or other support structure that has been secured to the floor of the waterway. Support frame 105 may, for example, be fabricated from ¾-inch schedule 40 PVC pipe.

Detector frame 410 comprises frame top portion 430 (which is on the bottom due to the inversion of the detector), frame bottom portion 435 (which is on the top due to the inversion of the detector) and frame side portion which is comprised of frame side panes 440c-e (and two additional frame side panels on the opposing side which cannot be seen in this view). Frame top portion 430 and frame bottom portion 435 are arcuate in shape when viewed from the top. Top frame portion 430 may be parallel to frame bottom portion 435 as shown here. Frame side panels 440c-440e (and the two side panels not shown) are also arcuate in shape and connect frame top portion 430 and frame bottom portion 435. Side panel 440c may be connected to or be made a part of support frame 405 as shown in FIG. 10. Alternatively, side panel 440c may not be directly connected to support frame 405 (as was illustrated with respect to the embodiment described above and shown in FIGS. 1-4). The number, placement, width and arcuate shape of side panels side panels 440c-440e (and the two side panels not shown) are exemplary as the frame side portion can be any shape and size that allows frame top portion 430 and frame bottom portion 435 to hold detector wires 420g-420j (and the other detector wires not shown) in place and provides one or more openings for water to flow through. Detector frame 410 may be fabricated from plastic material using a three-dimensional (3D) printer.

Detector wires 420g-420j (and the other detector wires not shown) may be insulated wires with a portion of the insulation stripped. Detector wires 420g-420j (and the other detector wires not shown) are connected at a first insulated area to frame top portion 430 and at a second insulated area to frame bottom portion 435. Detector wires 420g-420j (and the other detector wires not shown) may be positioned in apertures in frame top portion 130 and frame bottom portion 135. Such an arrangement allows for easy connection to electrical wires 419e-419j (and other electrical wires not shown) that connects to a monitoring station (not shown) or data logger (not shown). Detector wires 420g-420j (and the other detector wires not shown) may be set apart and arranged in an arcuate pattern as viewed from above. The conductors of detector wires 420g-420j (and the other detector wires not shown) may be, for example, copper wire; however, the conductors may comprise any conductive material. Detector wires 420g-420j (and the other detector wires not shown) may be any gauge or diameter. Although shown in this embodiment to be pairs of detector wires, other conductivity detectors may be used.

Injection port 415, which in this embodiment comprises hydrofoil 445 and diffuser stone 495, is connected to support frame 405 by diffuser connector 490 of diffuser stone 495 and has a tracer outlet 499 that releases conductive tracer solution. Alternatively, injection port 415 may be connected to detector frame 410. Such an alternative connection is not shown in FIG. 10. Injection port 415 is positioned on the side of detector frame 410 opposite frame side panels 440c-440e (and the other side panels not shown); however, all or a portion of injector port 415 may be below frame top portion 430. Tracer outlet 499 may be positioned about equidistant from each of the detector wire pairs. The distance may vary with the size of detector frame 410 in order to keep all of the detector wire pairs at approximately the same distance from injection port 415. In an exemplary embodiment, diffuser stone 495 measures about 0.9 cm in diameter having a length of about 3 cm with a connector piece measuring about 0.87 cm. The top and vertical surfaces of diffuser stone 495 may be sealed to ensure that the tracer only ejects from the bottom of the stone. This may be done using any sealant but may be, for example, silicone or similar sealant. Diffuser connector 490 is in fluid communication with tracer tubing 475, which carries tracer from a tracer reservoir (not shown) via a pump (not shown) to diffuser connector 490 where it passes through diffuser stone 495 and out tracer outlet 499.

Figure 6:
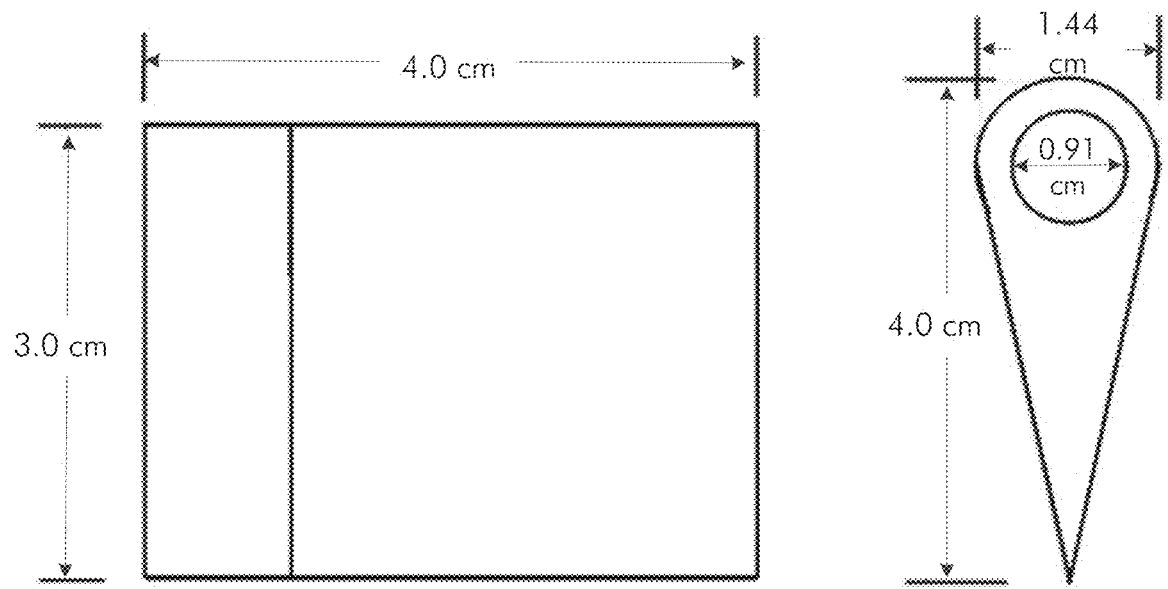
FIG. 6 is a diagram showing a side view (left) and a top view (right) of an exemplary hydrofoil according to an embodiment of the present invention.

Hydrofoil 445 may be made from any material that is able to structurally withstand the environment without deformation. As an example, hydrofoil 445 may be created from a plastic material using a 3D printer. Side (left) and top (right) views of hydrofoil 445 are shown in FIG. 6 along with exemplary dimensions.

FIG. 10 illustrates exemplary pulse tracer injections at different velocities. Pulse tracer injection 483 occurs at a high water velocity and pulse tracer injection 484 occurs at a low water velocity.

In an embodiment, illustrated in FIGS. 11 and 12, cross-type APTV 500 comprises support frame 535, detector frame 505 arranged in the shape of a cross, injection port 540 and plurality of detector wire pairs 515-518. Cross-type APTVs may be used, for example, for measurement of low velocity ranges with relatively straight flow conditions.

Detector frame 505 comprises vertical portion 505a and horizontal portion 505b that are connected at central portion 505c in an at least an approximately perpendicular manner to form a cross shape. Vertical portion comprises top portion 506 and bottom portion 508 located on opposite sides of central portion 505c. Horizontal portion comprises left portion 509 and right portion 507 located on opposite sides of central portion 505c. Openings 530-533 are located in top portion 506, right portion 507, bottom portion 508 and left portion 509, respectively. Openings 530-533 allow the water or medium being measured to flow there through. Detector frame 505 may be, for example, fabricated from plastic materials. Detector frame 505 may also be made, for example, using a plurality of pipes, such as PVC pipes, and pipe connecting elements. Alternatively, detector frames may also, for example, be fabricated using a 3D printer.

Detector wire pairs 515-518 are positioned on detector frame 505 in a cross pattern as illustrated in FIG. 11. Detector wire pair 515, which comprises detector wires 520 and 521, is connected to top portion 506 of vertical portion 505a and to central portion 505c. Detector wire pair 516, which comprises detector wires 522 and 523, is connected to right portion 507 of horizontal portion 505b and to central portion 505c. Detector wire pair 517, which comprises detector wires 524 and 525, is connected to bottom portion 508 of vertical portion 505b and to central portion 505c. Detector wire pair 518, which comprises detector wires 526 and 527, is connected to left portion 509 of horizontal portion 505b and to central portion 505c. Detector wire pairs 515-518 may, for example, generally be used to measure the up, right, down and left flow directions, respectively. Openings 530-533 are located at least in part behind detector wire pairs 515-518, respectively, such that detector wire pairs 515-518 are at least partially suspended over openings 530-533, respectively. As shown in FIG. 11, each of the two detector wires that makes up each of detector wire pairs 515-518 are set apart from each other and are approximately parallel to each other. Each of the connections of detector wire pairs 515-518 to central portion 505c may be spaced apart from each other.

Detector wires 520-527 may be insulated wires with a portion or all of the insulation stripped. A central portion of each of detector wires 520-527 may be stripped leaving insulation at both ends of each of detector wires 520-527 and exposing the conductor thereof to the water. Detector wires 520-527 may be secured at one end to central portion 505c and/or secured at their second end to their respective top, right, bottom or left portion 506-509. The secured portion of detector wires 520-527 may be insulated. One or more of central portion 505c, top portion 506, right portion 507, bottom portion 508 and left portion 509 may have apertures through which the respective connected detector wires 520-527 pass from the outside of detector frame 505 to the interior of detector frame 505 rather than being directly secured to the respective portion of detector frame 505. After passing into the interior of detector frame, detector wires 520-527 can be routed, possibly through support structure, to a data logger (not shown). Detector wire pairs 520-527 may be used to measure the change in conductivity within the water column by use of the data logger taking half-bridge measurements in the same manner as that described above with respect to the arc-type APTV embodiments. Such measurements may be taken continuously, at regular time intervals or as programmed by a user.

Support frame 535 is connected to detector frame 505 and can aid in suspension of APTV 500 from a larger support structure (not shown) or secure it to a pole (not shown) or other support structure that has been secured to the floor of the waterway. Support frame 505 may, for example, be fabricated from plastic and may also be made from pipes, for example, PVC pipes. Top portion 506 of vertical portion 505a may connect to support frame 535 and create a upside down U-shape with vertical portion 505a when viewed from the side (as can be seen in FIG. 12). Support frame 535 may also have an opening where it connects to another vertical piece, such as a pipe, to carry detector wires to the data logger and tracer tubing from a tracer reservoir (both of which may be a part of an APTV field station, such as that described above).

Injection port 540, which in this embodiment comprises a hydrofoil (as illustrated in and described above with respect to FIG. 6) and may comprise a diffuser stone (as illustrated in and described above with respect to FIG. 5), is connected to support frame 535 and has tracer outlet 555 that releases conductive tracer solution. Injection port 540, as illustrated in FIG. 12, is positioned in front of detector frame 505 (which is the side of detector frame 505 having detector wires 520-527). Tracer outlet 555 may be positioned about equidistant from detector wire pairs 516 and 518. If present, the top and vertical surfaces of the diffuser stone may be sealed to ensure that the tracer only ejects from the bottom of the stone. This may be done using any sealant but may be, for example, silicone or similar sealant. Tracer outlet 555 is in fluid communication with tracer tubing (not shown), which carries tracer from a tracer reservoir (not shown) via a pump (not shown) to injection port 540 where it passes through a diffuser stone, if present and out tracer outlet 555.

By using injection port 540 to inject a small amount of tracer as described above upstream of detector wire pairs 515-518, the conductivity of the medium as affected by the passing pulse of the tracer is measured by the data logger (not shown). Tracer curves may then be plotted from the measurements taken by each of detector wire pairs 515-518. The tracer curves may be utilized to derive velocity magnitude and direction as well as dispersion in the water column. The tracer injections may be made using pumps (not shown), such as peristaltic pumps, in fluid communication with injection port 540, which may be connected and used as described above with reference to the arc-type APTV embodiments.

FIG. 12 illustrates exemplary pulse tracer injections at different velocities. Pulse tracer injection 550 represents a low water velocity (e.g. ~1 cm·sec$^{-1}$) and pulse tracer injection 545 represents a high water velocity (e.g. 5 cm·sec$^{-1}$). In alternative embodiments, detector wire pair 517 can be extended or lowered or an additional detector wire pair can be added to bottom portion 508 below detector wire pair 517 to measure lower velocities.

Figure 13:
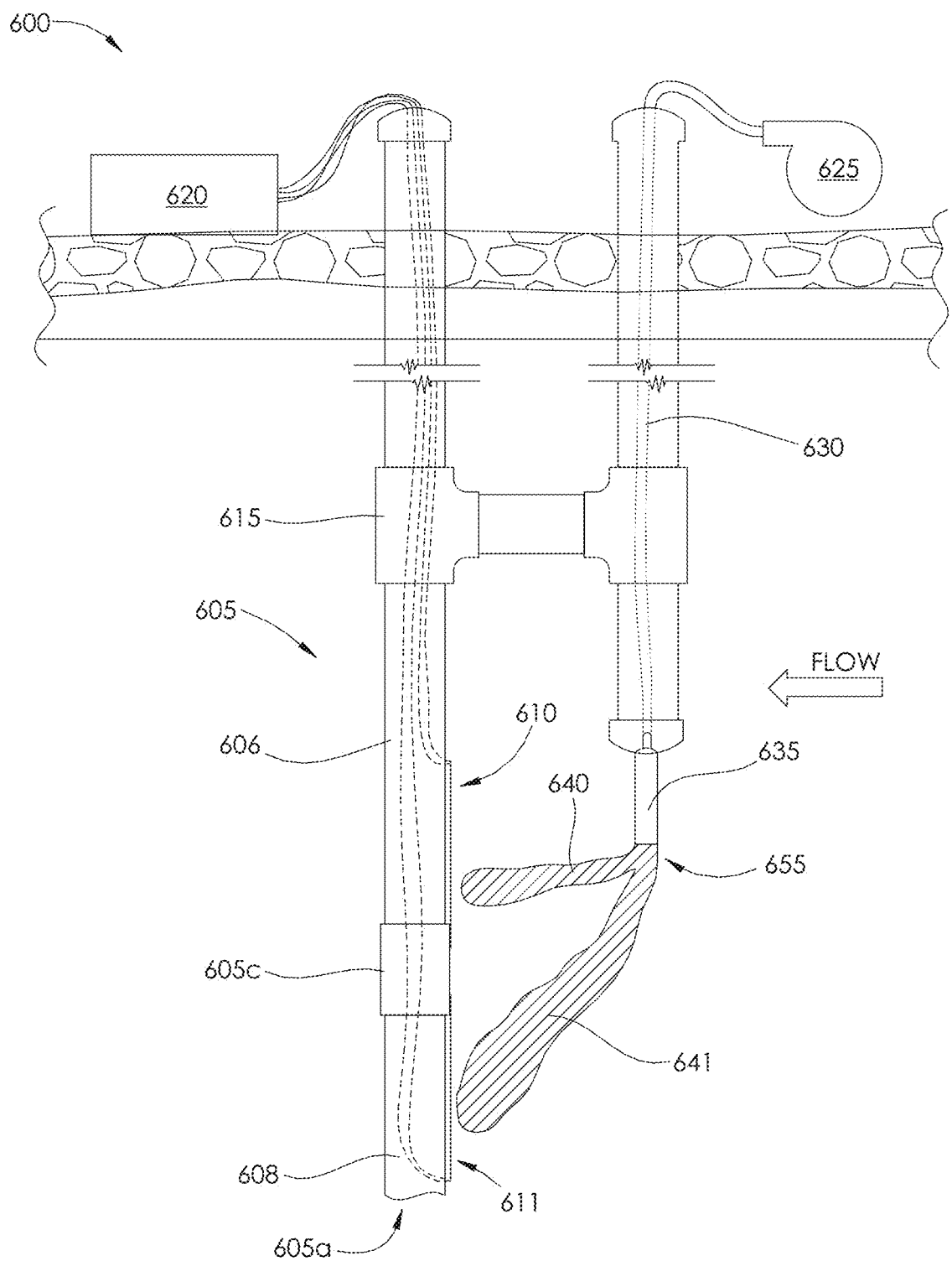
FIG. 13 is an elevational side view of a modified cross-type APTV according to an embodiment of the present invention.
Figure 14:
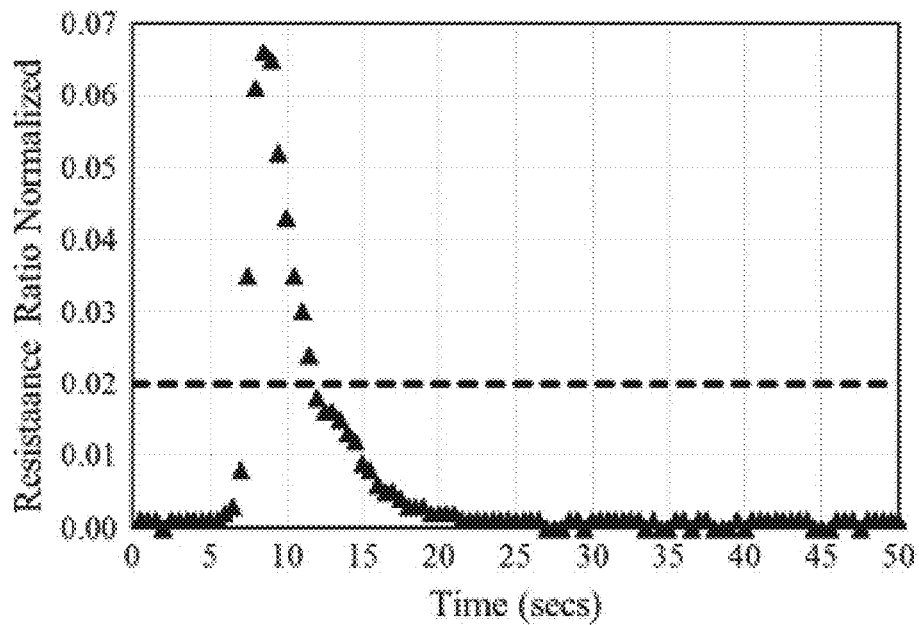
FIG. 14 is a graph showing an exemplary pulse tracer response curve generated by an APTV in a hydraulic flume.

A modified cross-type APTV may be used for groundwater applications and for strait flows as illustrated in FIG. 13. Care should be taken while drilling the wells to ensure the in-situ soil would not be significantly disturbed (this may require specialized drilling equipment). Modified APTV 600 comprises support frame 615, detector frame 605, an injection port comprising diffuser 635 and detector wire pairs 610 and 611.

Detector frame 605 comprises vertical portion 605a and central portion 605c. Vertical portion comprises top portion 606 and bottom portion 608 located on opposite sides of central portion 605c. There may be openings (not shown) in both top portion 606 and bottom portion 608 to allow water to flow there through. Detector frame 605 may be, for example, fabricated from plastic materials. Detector frame 605 may also be made, for example, using a plurality of pipes, such as PVC pipes, and pipe connecting elements. Alternatively, detector frames may also, for example, be fabricated using a 3D printer.

Detector wire pairs 610 and 611 are positioned on detector frame 605 in a vertical manner. Detector wire pair 610 is connected to top portion 606 of vertical portion 605a and to central portion 605c. Detector wire pair 611 is connected to bottom portion 608 of vertical portion 605a and to central portion 605c. Detector wire pairs 610 and 611 may, for example, generally be used to measure the up and down flow directions, respectively. The openings in top portion 606 and bottom portion 608 are located at least in part behind detector wire pairs 610 and 611, respectively, such that detector wire pairs 610 and 611 are at least partially suspended over the opening the respective openings of top portion 606 and bottom portion 608. Although not shown in this view, each of the two detector wires that makes up each of detector wire pairs 610 and 611 are set apart from each other and at least approximately parallel to each other. Each of the connections of detector wire pairs 610 and 611 to central portion 505c may be spaced apart from each other.

The detector wires that make up detector wire pairs 610 and 611 may be insulated wires with a portion or all of the insulation stripped. A central portion of each of the detector wires may be stripped leaving insulation at both ends of each of the detector wires and exposing the conductor thereof to the water. The detector wires may be secured at one end to central portion 605c and/or secured at their second end to their respective top or bottom portion 606-608. The secured portion of the detector wires may be insulated. One or more of central portion 605c, top portion 606 and bottom portion 608 may have apertures through which the respective connected detector wires pass from the outside of detector frame 605 to the interior of detector frame 605 rather than being directly secured to the respective portion of detector frame 605. As shown in FIG. 13, the detector wires for detector pair 610 pass through apertures in top portion 606 into the interior of detector frame 605 and the detector wires for detector pair 611 pass through apertures in bottom portion 608 into the interior of detector frame 605. After passing into the interior of detector frame, the detector wires are routed through a portion of support structure 615, to data logger 620. Detector wire pairs 610 and 611 may be used to measure the change in conductivity within the water column by use of data logger 620 taking half-bridge measurements in the same manner as that described above with respect to the arc-type APTV embodiments. Such measurements may be taken continuously, at regular time intervals or as programmed by a user.

Support frame 630 is connected to detector frame 605 and can aid in suspension of APTV 600 from the ground level. Support frame 605 may, for example, be fabricated from plastic and may also be made from pipes, for example, PVC pipes. Top portion 606 of vertical portion 605a may connect to support frame 635 and create an H-shape with vertical portion 605a when viewed from the side. Support frame 635 may carry detector wires to data logger 620 and tracer tubing 630 from a tracer reservoir (not shown) via pump 625, which may be, for example, a peristaltic pump. Other components of the APTV field station as described above may also be used for recording, analyzing, transmitting and operating modified APTV 600.

Diffuser 635 (as also illustrated in and described above with respect to FIG. 5), is connected to support frame 635 and has tracer outlet 655 that releases conductive tracer solution. Diffuser 635, as illustrated in FIG. 13, is positioned in front of detector frame 605 (which is the side of detector frame 605 having detector wire pairs 610 and 611). The top and vertical surfaces of diffuser 635 may be sealed to ensure that the tracer only ejects from the bottom of diffuser 635. This may be done using any sealant but may be, for example, silicone or similar sealant. Tracer outlet 655 is in fluid communication with tracer tubing 630, which carries tracer from a tracer reservoir (not shown) via a pump 625 to diffuser 635 where it passes through diffuser 635 and out tracer outlet 655. A hydrofoil as described with respect to other embodiments herein can be used around diffuser 635.

By using diffuser 635 to inject a small amount of tracer upstream of detector wire pairs 610 and 611, the conductivity of the medium as affected by the passing pulse of the tracer is measured by data logger 620. Tracer curves may then be plotted from the measurements taken by each of detector wire pairs 610 and 611. The tracer curves may be utilized to derive velocity magnitude and direction as well as dispersion in the water column.

FIG. 13 illustrates exemplary pulse tracer injections at different velocities. Pulse tracer injection 641 represents a low water velocity and pulse tracer injection 641 represents a high water velocity. In alternative embodiments, detector wire pair 611 can be extended or lowered or an additional detector wire pair can be added to bottom portion 608 below detector wire pair 611 to measure lower velocities.

The movement characteristics of the injected pulse may be different compared to surface waters due to slower velocities, retardation factors and changes in soil characteristics. As such, a new calibration equation may be needed in order to achieve accuracy. This may be accomplished using other groundwater velocity measurement devices such as heat-pulse flow meter, passive flux meter and point velocity probes; or by a hydraulic gradient analysis using Darcy's Law and collected field data.

For all APTV embodiments, the detection range can be extended to capture lower velocities by decreasing the distance from the injection port to the conductivity detectors, lengthening the conductivity detectors (or detector wires), or by use of a tracer with equal density to the surrounding ambient water. More conductive, less dense tracers may increase the directional accuracy and extend the velocity range of embodiments of the APTV.

Exemplary embodiments of methods of calculating exemplary velocity, directional flow, and dispersion coefficients using cross-type and arc-type ATPVs are described below. Exemplary data was collected in both a laboratory-scale flume and field-scale constructed wetland and analyzed to determine the exemplary coefficients. Exemplary implementations in the form of laboratory (flume) and field tests were also performed. All data and calculations and parameters for the APTVs (e.g. distance from conductivity detectors to injection port, injection timing) including all details of the exemplary implementations described below are exemplary and should not be taken to limit the scope of the invention.

Unless described otherwise below, the arc-type APTV and cross-type APTVs used in these exemplary embodiments and implementations each used 8 gauge partially stripped wire detector pairs positioned about 5 cm downstream of the injection point and measured conductivity changes once about every 500 ms by use of a half bridge circuit and data logger. The injection ports of each comprised a small cylindrical diffuser stone measuring about 0.9 cm in diameter. The top and vertical surfaces of the diffuser stone were sealed with silicone so that the tracer exits from the bottom of the stone. For the cross-type APTV, a 3-D printed hydrofoil was used to smooth flow patterns around the injection port. For the arc-type APTV, five sets of wire detectors arranged in an equidistant radial configuration around the injection port were used. Each detector wire pair was spaced 37.5° radially measured from the injection port to produce a pulse detection range of 180°. The detector wire pairs were designated L2, L1, C, R1 and R2 pertaining to the −75°, −37.5°, 0°, +37.5°, and +75° offset from the centerline of the detector frame top, respectively (as illustrated in a similar embodiment in FIG. 5). A hydrofoil, similar to that shown in a similar embodiment in FIGS. 1-4, was positioned on the injection port. The injection port was physically incorporated into the detector frame. The stripped portion of the detector wires were positioned so that they did not come in contact with the detector frame to reduce interferences.

Exemplary Velocity Measurements.

Velocity measurements were derived from the tracer curves by simply measuring the time for the peak of the pulse ($\Delta t_{peak}$) to travel from the injection port to the detectors. By dividing the fixed distance between the injection port and the detectors by $\Delta t_{peak}$, a non-calibrated velocity is calculated termed the $\Delta t_{peak}$ velocity (APTV$\Delta t_{peak}$). However, as the tracer injection is made in a downward orientation, the mass of the tracer pulse must initially accelerate to match the velocity of the ambient water velocity. This acceleration delay should theoretically be more pronounced at higher velocities and less pronounced at lower velocities. To account for the delay, direct measurements were compared with a Sontek FlowTracker™ ADV and the resulting data plotted to determine a calibration equation to obtain calibrated velocities (APTV$_{CAL}$) to account for the delay. During calibration, at least seven incrementally increasing velocity regimes were tested, from the lowest range 0.20 cm·sec$^{-1}$ to the highest one of 6.2 cm·sec$^{-1}$. For each flow regime, the APTV was programmed to inject, measure and average 15 pulses. The FlowTracker™ ADV was programmed at a 10 Hz sampling frequency and 20 sec duration time per velocity measurement, resulting in an average of 200 ping measurements per velocity. A five minute settling time was applied between velocity increment testing to allow variations in velocity within the flume to equalize. ADV and APTV sampling volumes were positioned in the middle of the flume approximately 25 cm above the bottom surface of the flume whereas the FlowTracker™ ADV was positioned in a side-facing orientation so as not to interfere with the sampling volume. Finally, a verification test was performed comparing the calibrated cross-type APTV measurements with a Nortek Vector™ ADV, which was placed in a downward oriented position approximately 10 cm above the path of flow and 7 cm upstream of the APTV.

To add a level of quality control the signal to noise ratio (SNR) was calculated by dividing the peak signal by the average background noise outputted by the data logger. Using the SNR, peaks caused by weak pulses or background noise were excluded from the velocity calculations. As an example, if a pulse does not come in direct contact with a detector, a strong pulse will not occur and any resulting peaks will simply be due to variations in the background noise. By applying a cut-off SNR, such false peak readings are excluded. An example of a tracer pulse measurement with an applied SNR of 20 is displayed in FIG. 14. This exemplary pulse tracer response curve was generated by an APTV in a hydraulic flume using a sodium chloride (NaCl) tracer at 15 g·L$^{-1}$ concentration where the injection of the pulse occurred at zero seconds. The correlating peak detection time ($\Delta t_{peak}$) was measured at 8.5 seconds.

Exemplary Directional Calculations.

For the Arc-type APTV, directional components were calculated by taking the weighted average of the number of pulses detected above the SNR per detector wire pair. The detector wire pairs were designated as L2, L1, C, R1, and R2 pertaining to the −75°, −37.5°, 0°, +37.5°, and +75° offset from the center line of the detector frame top, respectively. If the center line of the detector frame top was aligned in a southern orientation, measurements made by the C detector wire pair would represent southern flows, while measurements made by the R2 detector wire pair would represent 75° west of the southern axis. The equation for calculating the APTV direction is given as follows:

$$\text{Direction}(°) = \frac{\Sigma_{L2=0}^{L2}(-75°) + \Sigma_{L1=0}^{L1}(-37.5°) + \Sigma_{C=0}^{C}(0°) + \Sigma_{R1=0}^{R1}(37.5°) + \Sigma_{R2=0}^{R2}(75°)}{n}$$

where L2 is the number of pulses detected above SNR by L2 detector wire pair, L1 is the number of pulses detected above SNR by L1 detector wire pair, C is the number of pulses detected above SNR by C detector wire pair, R1 is the number of pulses detected above SNR by R1 detector wire pair, R2 is the number of pulses detected above SNR by R2 detector wire pair, and n is the total number of pulses detected by all detector wire pairs.

As an example, if only the C (0°) detector wire pair measured pulses, the corresponding direction calculates as 0°, representative of direct southern flow, whereas if only the R1)(+37.5° detector wire pair measured pulses the direction calculates as 37.5° west of the southern axis. However, if only me pulse was detected on the C detector wire pair and four pulses were measured on the R1 detector wire pair, the direction is weighted towards the R1 detector wire pair resulting in a calculation of 31° west of the southern axis.

Vegetative Effects.

Four exemplary scenarios were tested in the hydraulic laboratory to simulate the effect on cross-type APTV velocity derivations for varying vegetation conditions in a flume. The first exemplary scenario is constrained by no vegetation, termed no aquatic vegetation (NAV), representing clear, open channel conditions. The second exemplary scenario is designed to simulate conditions of dense underwater vegetation, termed emergent aquatic vegetation (EAV), by introducing wooden stalks into the flume, which protruded out of the water surface. The third exemplary scenario is set up to simulate submerged vegetation, termed submergent aquatic vegetation (SAV), where all stalks were completely submerged. Finally, the fourth exemplary scenario is arranged to simulate the most complicated and real world situation, termed mixed aquatic vegetation (MAV), which contained a mixture of both SAV and EAV in the flume.

Artificial vegetation was made using 0.32 cm diameter wooden stalks. The length of stalk was 61.0 cm for EAV and 30.5 cm for SAV. The whole artificial vegetation setup was placed on a firm base made with a wooden support plank covered with a Plexiglas plate situated directly above to reduce bed friction. The length and width of the wooden plank measured 61.0 cm and 30.5 cm, respectively. Small weights were attached at the bottom of the base to prevent it from floating upward during full flow conditions. Holes measuring 0.32 cm diameter were drilled and the wooden stalks pushed firmly through the holes. The stalks were placed in a grid formation with 2.5 cm spacing.

Figure 16:
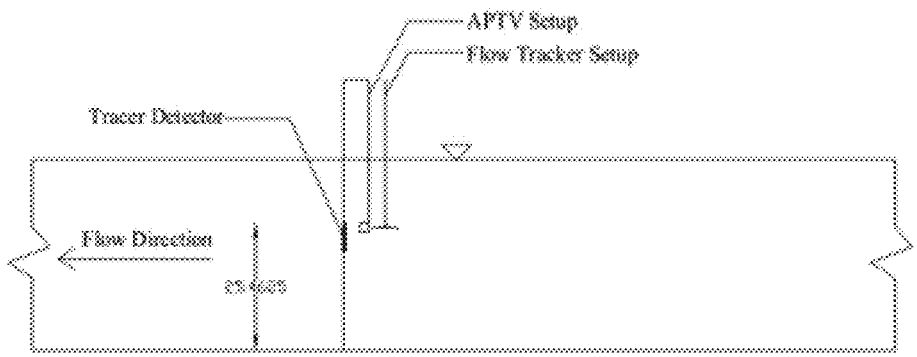
FIG. 16 is a block diagram of a laboratory setup for a no artificial vegetation (NAV) simulated environment according to an embodiment of the present invention.
Figure 17:
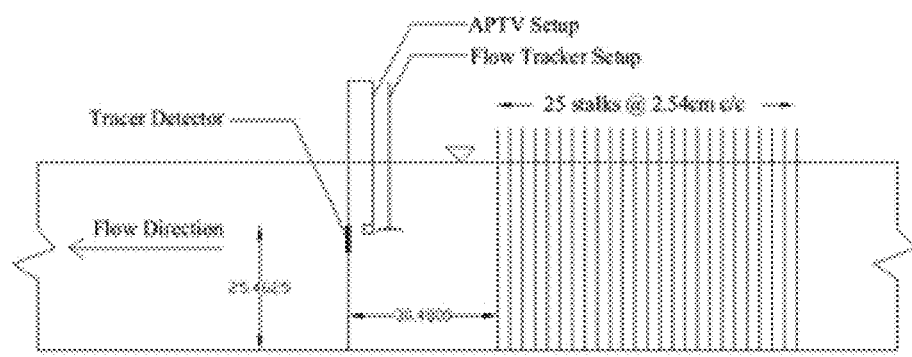
FIG. 17 is a block diagram of a laboratory setup for an emerged artificial vegetation (EAV) simulated environment according to an embodiment of the present invention.
Figure 18:
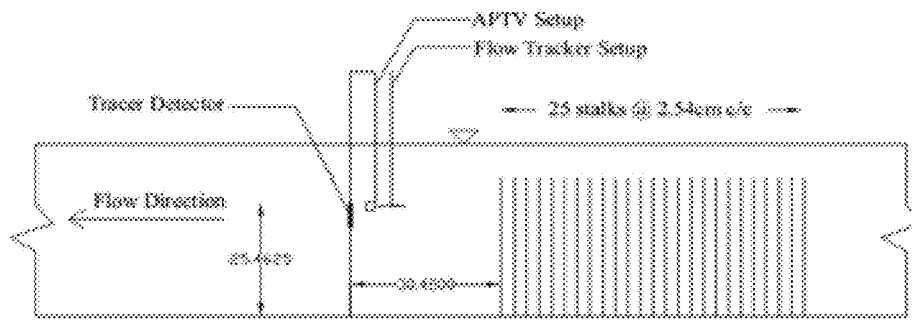
FIG. 18 is a block diagram of a laboratory setup for a submerged artificial vegetation (SAV) simulated environment according to an embodiment of the present invention.
Figure 19:
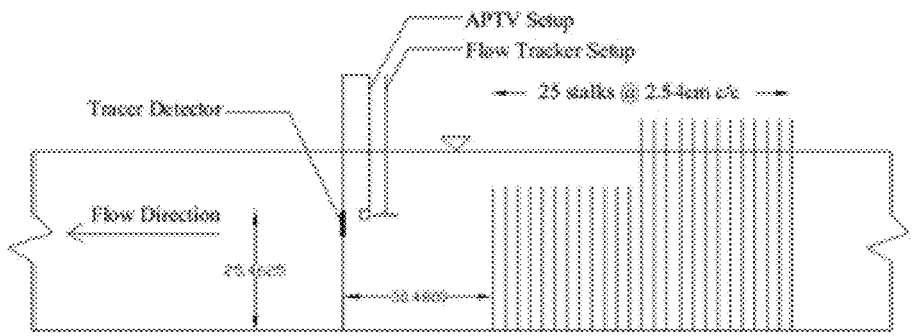
FIG. 19 is a block diagram of a laboratory setup for a mix artificial vegetation (MAV) simulated environment according to an embodiment of the present invention.
Figure 20:
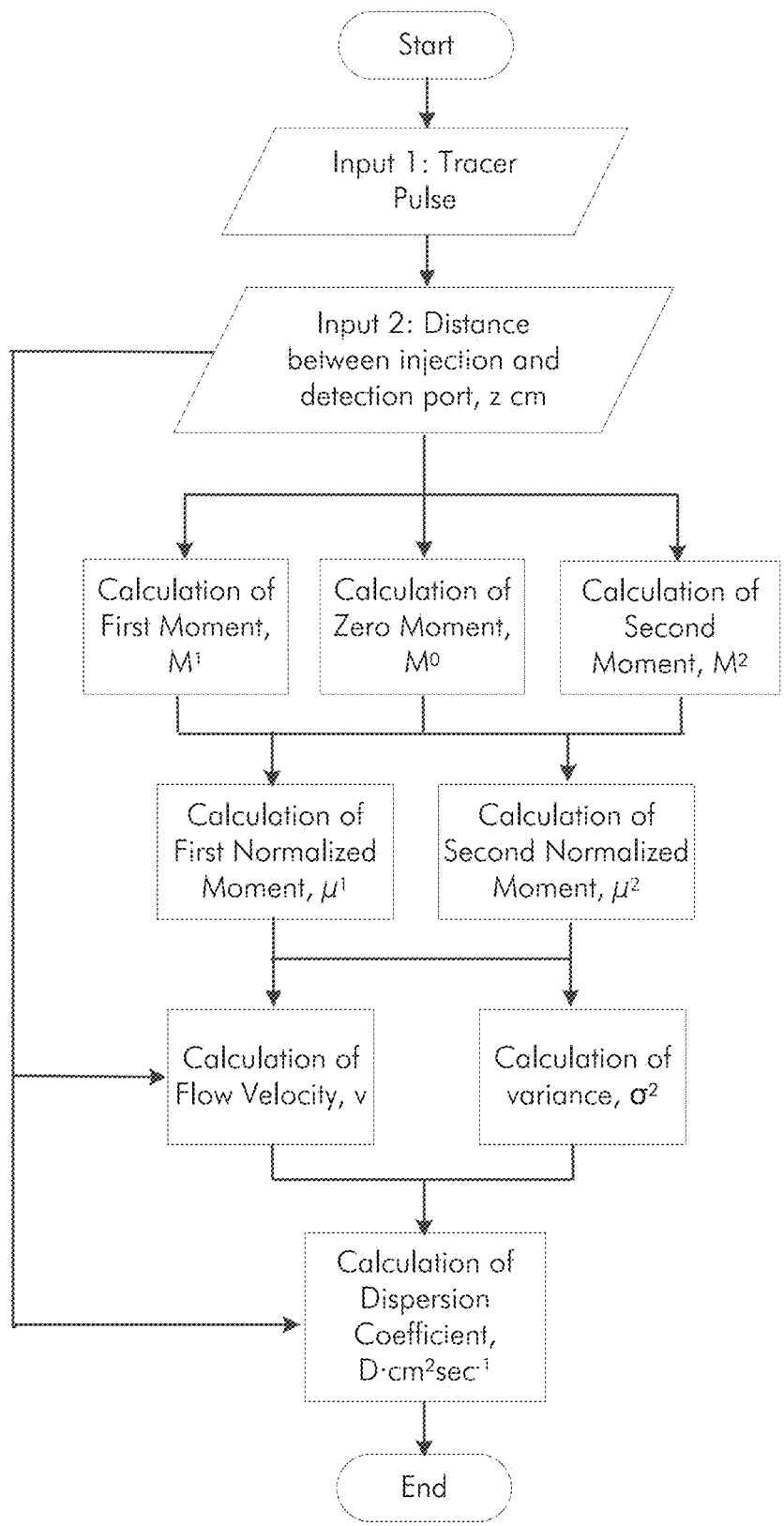
FIG. 20 is a flowchart showing a method of calculating a dispersion coefficient according to an embodiment of the present invention.

A total of 288 wooden stalks were placed on the base, which was equivalent to 1.25% vegetation coverage over the area. The whole artificial vegetation setup was placed in front of the APTV at a distance of 30.5 cm from the center of the detector. During mixed SAV and EAV measurements, the first half of the artificial vegetation setup (in front of APTV detector) was comprised of SAV whereas the remaining half was EAV. The whole artificial vegetation setup, along with Cross-type APTV and FlowTracker™ ADV for the EAV and SAV lab experiment scenarios are shown in FIGS. 16 (NAV), 17 (EAV), 18 (SAV) and 19 (MAV).

A statistical moment analysis technique was applied to define the dispersion coefficient from the tracer pulse. Such methods have been conventionally used in estimating the pore-water velocity and dispersion coefficients for column breakthrough data sets in laboratory experiments, especially for conservative tracers. In all the laboratory scenarios, flow of water was assumed to be unidirectional and the tracer conservative tracer without degradation effects. The ith temporal moment of tracer concentration distribution at a distance of x, from the injection point defined as Eq. (1):

$$M_i = \int_0^\infty t^i c(x,t) dt \tag{1}$$

Then, the ith normalized moment of the distribution can be calculated as Eq. (2):

$$\mu_i = \frac{M_i}{M_0} = \frac{\int_0^\infty t^i c(x,t) dt}{\int_0^\infty c(x,t) dt} \tag{2}$$

First, the normalized time moment, $\mu_1$ was used to identify the central tendency of the tracer curve. The second central moment or the variance, $\sigma_t^2$, was used to describe the spreading of the tracer pulse and can be calculated using the first and second normalized moment as $\sigma_t^2 = \mu_2 - \mu_1^2$. The first and second moments are related to tracer transport parameters. Relation between the normalized moments and dispersion coefficient is shown as Eq. (3). The final calculation of the dispersion coefficient was conducted by running a MATLAB code considering Eqs. (1)-(3) and following the flow chart shown in FIG. 20:

$$D = \frac{v^3}{2x} \sigma_t^2 \tag{3}$$

Exemplary APTV Field Measurements.

Field measurements were conducted in a cell of a large constructed wetland measuring approximately 4.8 km in length and 2 km in width. Receiving waters enter the cell through weir structures capable of adjusting the inflow and discharge rates. The surrounding vegetation was mainly composed of both submerged aquatic vegetation (SAV) including chara and hydrilla species, as well as emergent aquatic vegetation (EAV) primarily dominated by cattail. The station was installed in water depths typically ranging from 50 cm to 58 cm. Both a cross-type and arc-type APTV and a Vector ADV were installed and orientated so as to place both the sampling volumes approximately 25 cm above the bottom floor. Dominant southern flows were expected, so sampling volumes were spaced approximately 15 cm horizontally apart from one another along the east-west axis. The immediate surroundings from the sampling location comprised clear open water, with dense EAV located approximately 2 m to the north, east and west and clear open water to the south. As such, the NAV calibration equation was applied for the field conditions.

For field measurements, APTV and ADV field stations were constructed capable of continuous, remote sampling of water velocities. The APTV station (similar to that shown in FIG. 8) was fitted with a Raven XTV cellular modem capable of transmitting data via 3G CDMA cellular networks. This enabled the APTV station to be remotely controlled and operated from anywhere with an internet connection by means of a static IP address. Also included in the APTV field station were two peristaltic pumps, a 12 V DC deep cycle battery, CR1000 data logger, multiplexer, 4 W solar panel, charge regulator and 38 L tracer reservoir. The CR1000 communicated with the Raven XTV via RS-232 serial cable. An AM32/64 multiplexer was attached the data logger to expand the number of available ports for detectors, enabling a total of 38 detector wires to be attached. Due to weak cellular signal strength at the remote location, a 1 dB omni-directional antenna was fitted to the Raven, thereby boosting transmission rates to about 90 byte per second.

Side-by-side velocity measurements were taken for a 3-day duration. The Vector ADV was programmed to conduct 10 velocity measurements at an 8 Hz sampling frequency every hour. This resulted in a total of 80 pings being made and averaged per measurement. The APTV station was programmed using Campbell Scientific™ CRBasic™ software to conduct a 5 minute record time every hour. The first 30 seconds of the record time were designated as a settling time to allow any background noise to settle, which typically took approximately 20 seconds. Following the 30 seconds settling time, the station was programmed to make 5 injections every 30 seconds with half bridge measurements sampling frequency of 500 ms. A 15 mg L$^{-1}$ NaCl solution was used as the tracer and stored in a 38 L container.

Laboratory Velocity Tests.

Figure 21:
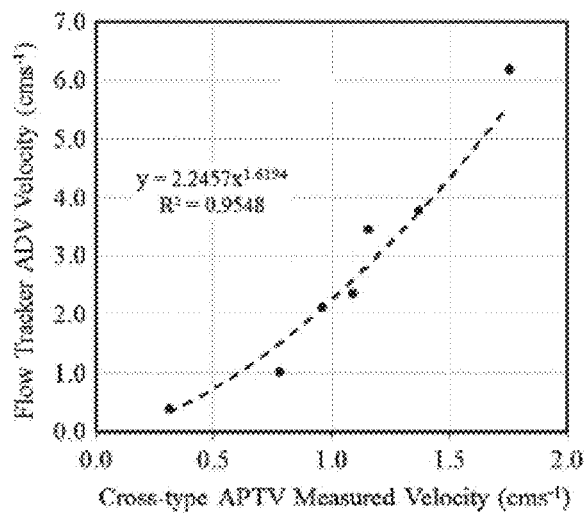
FIG. 21 is a graph showing an exemplary calibration curve developed from direct comparison of the raw velocity data of a cross-type APTV using the $\Delta t_{peak}$ method and the velocity data of the Sontek™ FlowTracker™ ADV.
Figure 22:
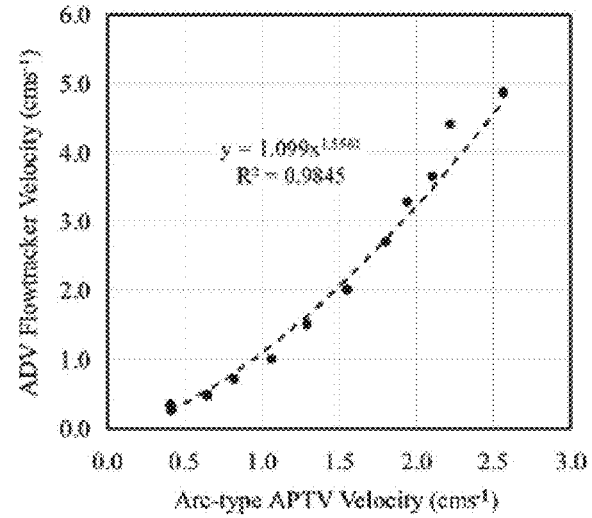
FIG. 22 is a graph showing an exemplary calibration curve developed from direct comparison of the raw velocity data cross-type APTV using the $\Delta t_{peak}$ method and the velocity data of the Sontek™ FlowTracker™ ADV.
Figure 23:
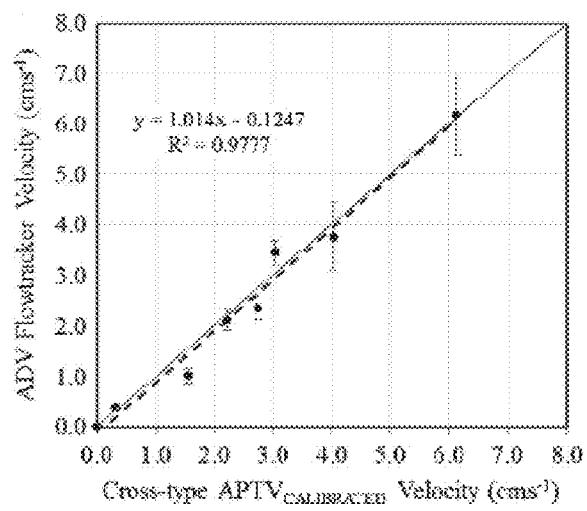
FIG. 23 is a graph showing an exemplary laboratory comparison between the calibrated velocity data of a cross-type APTV and the velocity data of the FlowTracker™.
Figure 24:
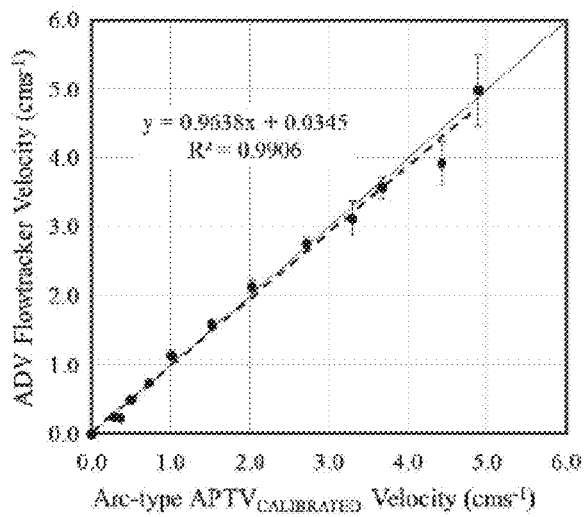
FIG. 24 is a graph showing an exemplary laboratory comparison between the calibrated velocity data of an arc-type APTV and the velocity data of the FlowTracker™.

In order to develop a means of accounting for the acceleration delay caused by the higher density of the tracer, an empirical approach was formulated to develop a calibration equation based on comparative measurements with a Sontek FlowTracker™ ADV. FIGS. 21 and 22 display APTV measurements plotted against ADV measurements. As seen, a clear power relationship exists between measurements of the two devices. This is expected as the tracer delay is more pronounced at higher velocities. By applying a power regression equation (cross-type R-squared=0.9334, arc-type R-squared=0.9845) the following calibration equations are formed:

$$\text{Cross-type:} APTV_{(CAL)} = 2.2457 (APTV_{\Delta tpeak})^{1.6194} \tag{4}$$

$$\text{Arc-type:} APTV_{(CAL)} = 1.099 (APTV_{\Delta tpeak})^{1.5561} \tag{5}$$

where $APTV_{\Delta tpeak}$ is APTV velocity from the $t_{peak}$ method and $APTV_{(CAL)}$ is calibrated APTV velocity. FIGS. 23 and 24 display the calibrated APTV velocities for the cross-type (FIG. 23) and arc-type (FIG. 24) to the ADV data with standard error bars as compared to ADV velocities. The scatter plots represent the APTV measurements with linear regression applied (dashed line).

Figures 25, 26:
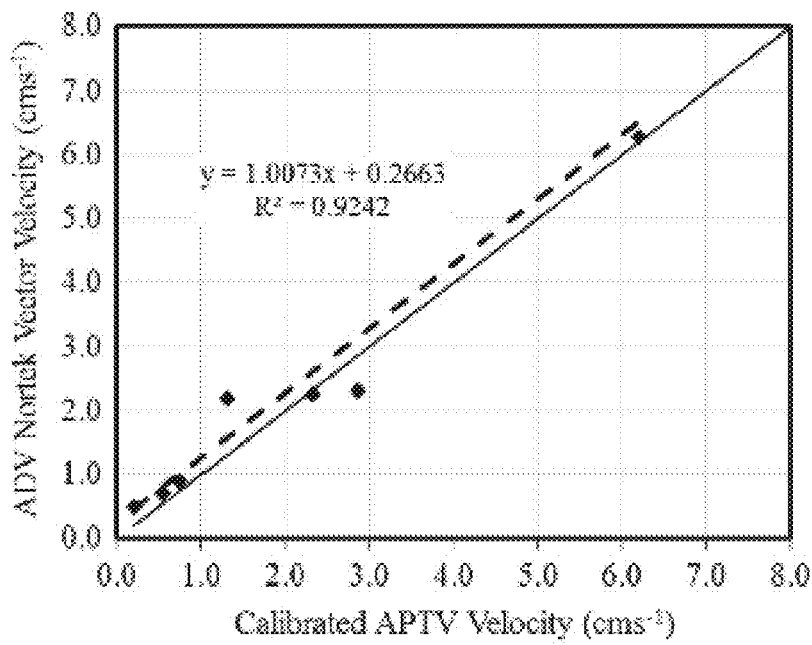
FIG. 25 is graph showing an exemplary laboratory verification test between the calibrated velocity data of a cross-type ATPV and the velocity data of the Vector™.
FIG. 26 is a table comparing the expected directional flow and the exemplary directional flow as measured by an arc-type APTV.
Figure 27:
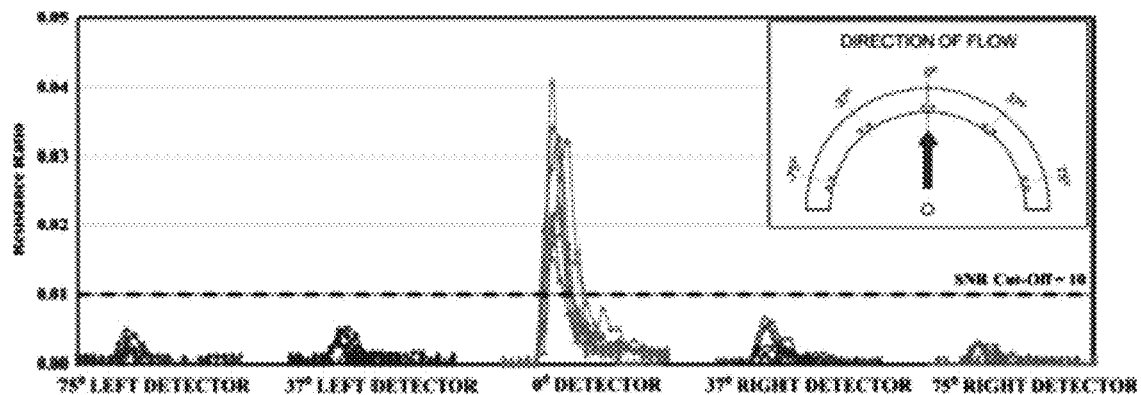
FIG. 27 is a graph of exemplary laboratory directional tracer response curves using an arc-type ATPV for 0°.
Figure 28:
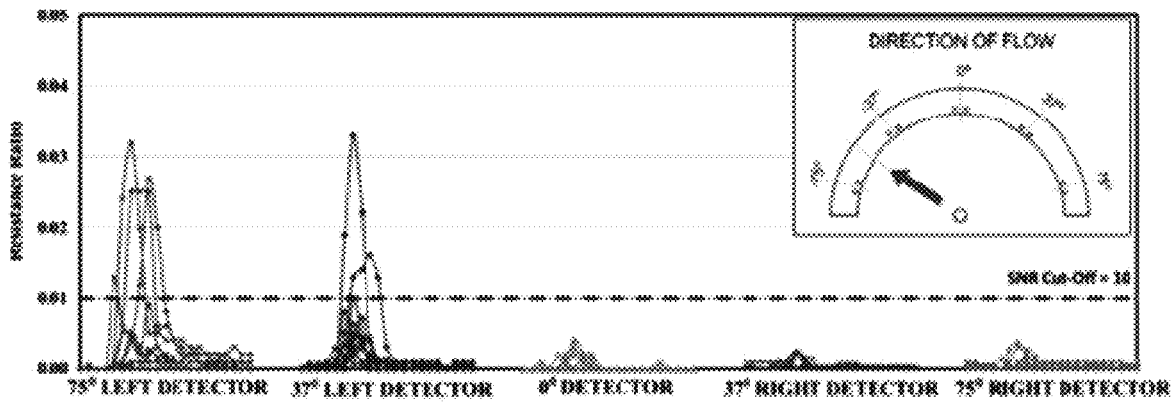
FIG. 28 is a graph of exemplary laboratory directional tracer response curves using an arc-type ATPV for 56° left.
Figure 29:
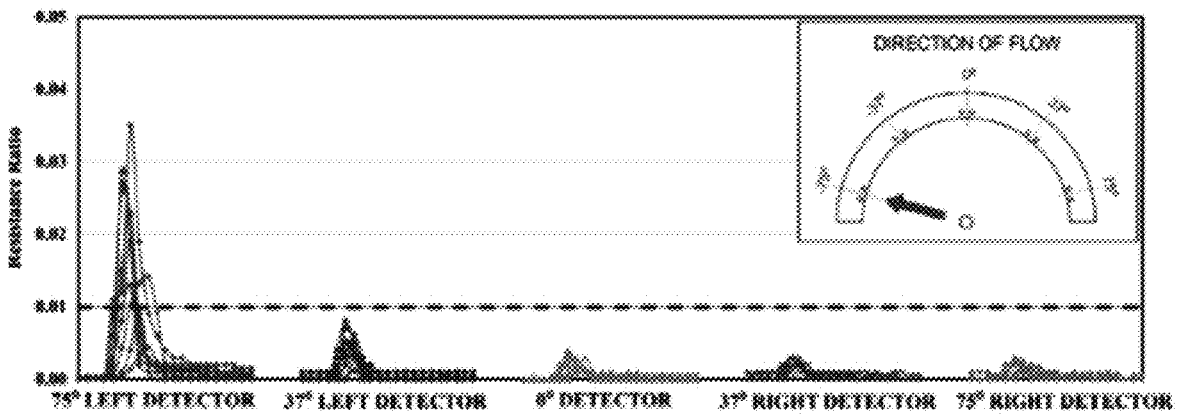
FIG. 29 is a graph of exemplary laboratory directional tracer response curves using an arc-type ATPV for 75° left.

To test the validity of the calibrated cross-type APTV sensor, a second incremental "verification" velocity test was conducted in the hydraulic flume using an ADV produced by a different manufacturer (Nortek Vector™ ADV). The calibrated APTV velocity (Eqs. (4) and (5)) are compared against the Vector™ ADV data, as shown in FIG. 25). A linear regression (dashed line) indicates that a close agreement between Vector™ ADV measurements and APTV measurements results with an R-squared value of 0.9242, similar to R-squared values obtained when comparing to FlowTracker™ ADV data.

Exemplary Arc-Type APTV Laboratory Directional Tests.

The table of FIG. 26 summarizes the directional measurements and difference from expected values for the nine different directional angles measured. A maximum difference of −10° was measured for the flow scenario with a flow angle directed 56° to the right of the center detector. Tracer response curves for directional measurements made by the arc-type APTV for 0°, 56° left and 75° left flow directions tested in the hydraulic flume are displayed in FIGS. 27-29, respectively. For the directional measurement calculations, a SNR cut-off of 10 was selected. As expected a clear increase in pulse peaks is witnessed relating to the direction of flow. Generally, peak signals for flow directions directed towards detectors (0°, 37°, 75°) recorded peak SNR values of around 30-40, whereas flow directions set in between detectors (18°, 56°) experienced about a 25% decrease in peak SNR to about 25-30. Regardless, the peaks remained above the SNR cut-off value of 10.

Figure 30:
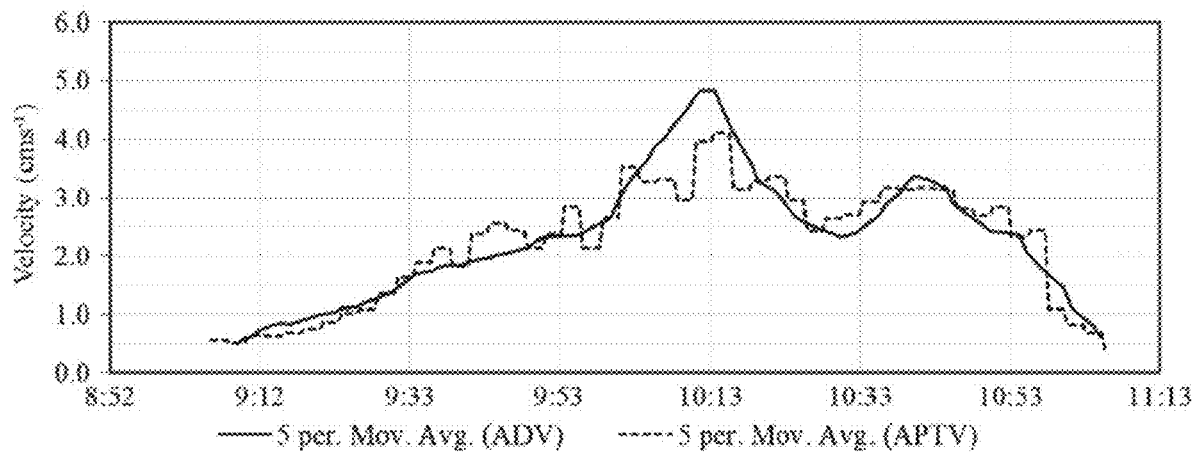
FIG. 30 is a graph comparing exemplary velocity magnitudes of an ADV and an arc-type APTV in a hydraulic flume during rapid velocity fluctuations.
Figure 31:
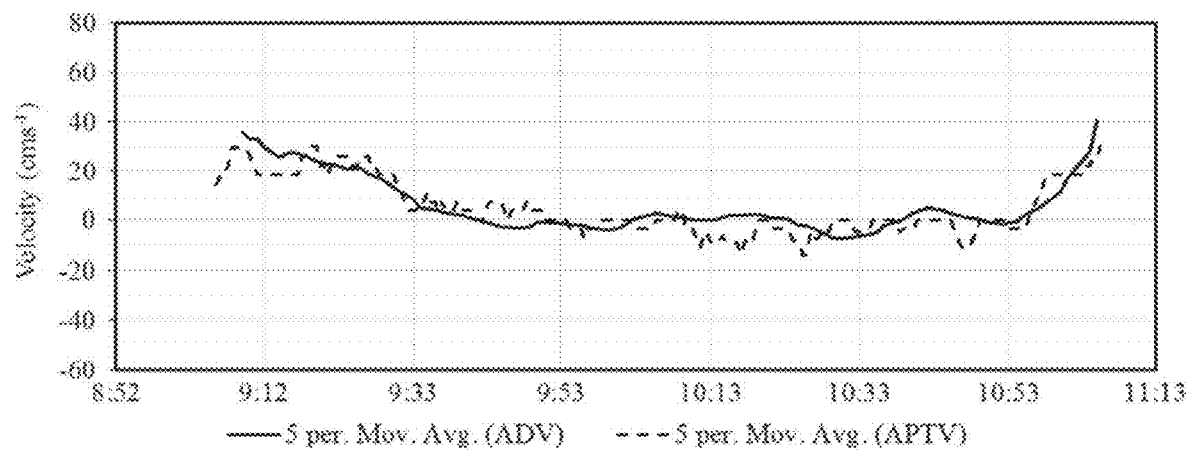
FIG. 31 is a graph comparing exemplary flow direction of an ADV and an arc-type APTV in a hydraulic flume during rapid velocity fluctuations.
Figure 32:
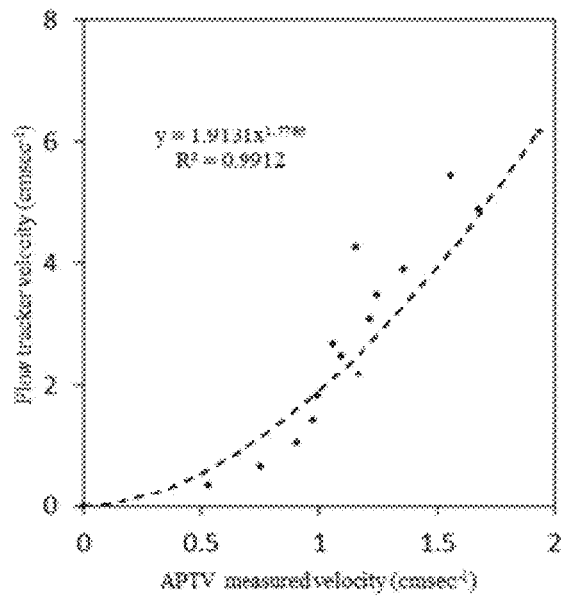
FIG. 32 is a graph showing an exemplary calibration curve using the $\Delta t_{peak}$ method for SAV.
Figure 33:
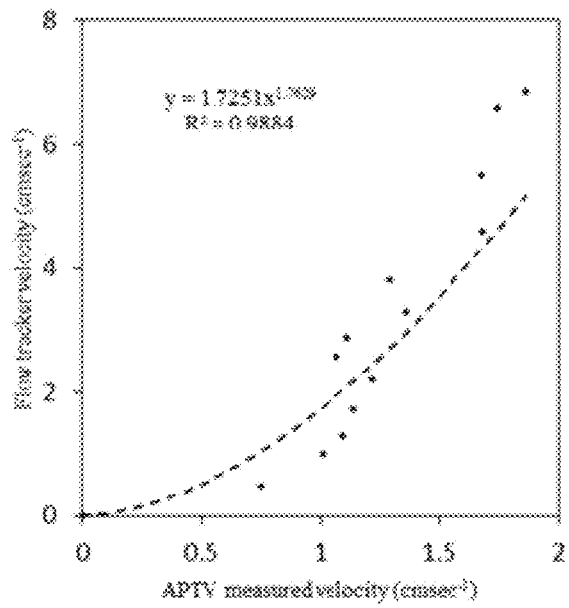
FIG. 33 is a graph showing an exemplary calibration curve using the $\Delta t_{peak}$ method for EAV.
Figure 34:
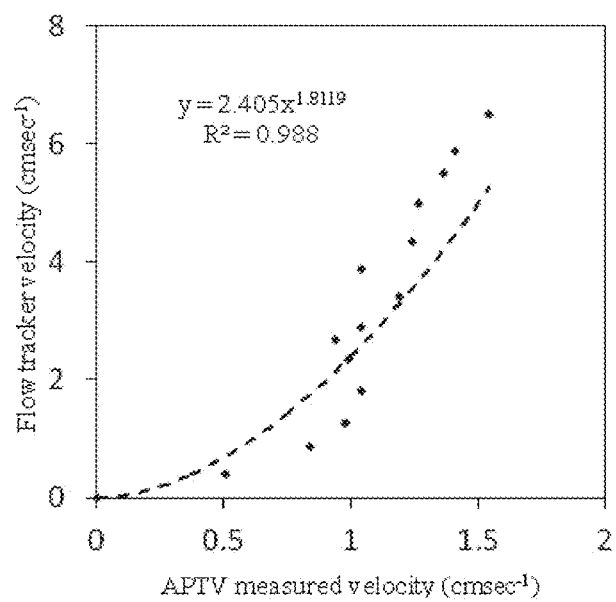
FIG. 34 is a graph showing an exemplary calibration curve using the $\Delta t_{peak}$ method for MAV.

The accuracy of the APTV may decrease with a decrease in pulses averaged per velocity measurement. Ideally, several pulses should be conducted and averaged per measurement; however, this methodology may not be possible for environments with highly variable velocity conditions such as those influenced by precipitation events, whereby velocity values may significantly alter within minutes. In order to test the functionality of the arc-type APTV in rapid variable flow conditions, a flume test was conducted whereby the velocity was incrementally altered on short time scales. Both the APTV and a FlowTracker™ ADV were installed to take continuous measurements for comparative purposes. An average of 3 pulses per measurement was used for APTV measurements. FIG. 30 compares the velocity magnitude, whereas FIG. 31 compares the flow direction.

Exemplary Vegetative Effects on Calibration Equations.

As velocity data is measured by a pulse tracer propagating through the water, an exemplary analysis was conducted to determine to what degree calibration equations would be affected by dense SAV and EAV environments. Calibration Eqs. (6)-(8) for the SAV, EAV, and MAV, respectively, are presented below. Graphs of the exemplary calibration curves for the artificial vegetation scenarios are displayed in FIG. 32-34.

$$APTV_{CAL(SAV)} = 1.9131(APTV_{\Delta tpeak})^{0.9912} \quad (6)$$

$$APTV_{CAL(EAV)} = 1.7251(APTV_{\Delta tpeak})^{1.7629} \quad (7)$$

$$APTV_{CAL(MAV)} = 2.4050(APTV_{\Delta tpeak})^{1.8119} \quad (8)$$

where $APTV_{CAL}$ is the calibrated APTV velocity and $APTV_{\Delta tpeak}$ is the velocity measured using $\Delta t_{peak}$ method.

Comparison between the calibration curves was done using four statistical parameters including coefficient of determination (R-square), root mean square error (RMSE), mean percentage error (PE) and ratio of standard deviation (RSD). The results of the statistical parameters are presented in the table of FIG. 35.

All of the calibration curves showed consistent R-square values with a maximum value of 0.9971 for NAV and minimum value of 0.9880 for MAV. The RMSE values for EAV and MAV are quite higher (40.9 cm s−1) than the other two scenarios. Higher values of RMSE indicate that EAV and MAV are not sensitive enough to low velocities as compared to NAV and SAV. Presence of EAV creates disturbance for low range velocity measurements. Similar trends are shown by the other two statistical parameters. PE for EAV and MAV are quite higher (>30%) than SAV and NAV. NAV has the lowest PE values than the others. Furthermore, NAV shows the highest RSD value which is quite natural due to the absence of any artificial vegetation. However, despite having vegetation in SAV, it shows a RSD value of 0.835. This means the regression model is quite consistent for SAV.

Figures 35, 36, 37:
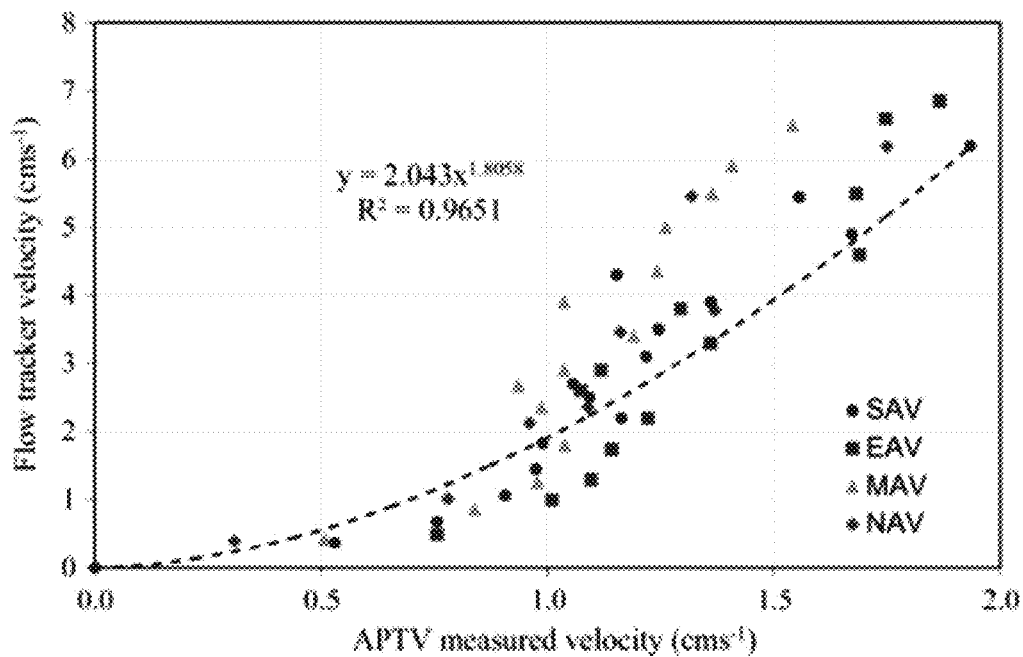
FIG. 35 is a table showing an exemplary statistical summary of exemplary calibration equations using the $\Delta t_{peak}$ method.
FIG. 36 is a graph showing combined exemplary calibration equations using the $\Delta t_{peak}$ method.
FIG. 37 is a table showing an exemplary statistical summary of an exemplary combined calibration equation using the $\Delta t_{peak}$ method.
Figure 38:
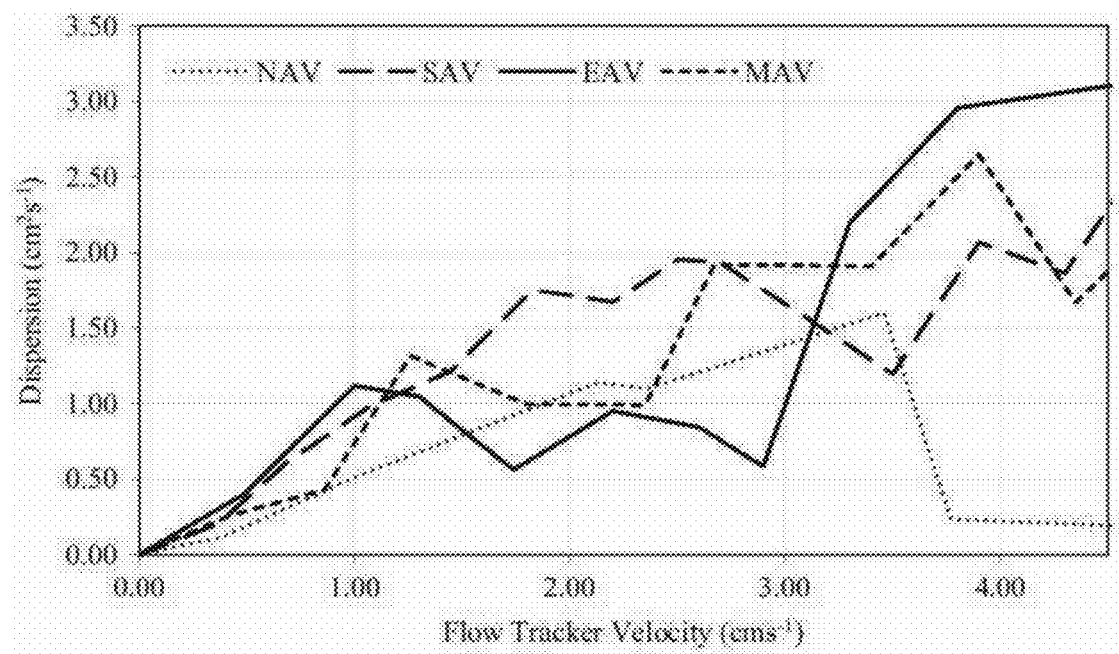
FIG. 38 is a graph showing the change in dispersion coefficients (cm$^2$ sec$^{-1}$) with varying velocities regimes for exemplary scenarios.

A combined calibration (CC) curve for the APTV was developed using the dataset collected for all four lab scenarios. The main objective of developing a CC curve was to increase the versatility of APTV with respect to different surrounding vegetative conditions. The CC curve is shown in FIG. 36 and the corresponding equation for CC is shown in Eq. (9). Statistical comparison of the CC equation to all individual scenarios is shown in the table of FIG. 37.

$$APTV_{CAL(combined)} = 2.043(APTV_{\Delta tpeak})^{1.8058} \quad (8)$$

where $APTV_{CAL(combined)}$ is calibrated APTV velocity for all scenarios.

Exemplary Laboratory Dispersion Tests.

Dispersion coefficients for the four exemplary scenarios were calculated using Eq. (4). The change of dispersion coefficient with varying velocity regimes for all the scenarios is displayed in FIG. 38. Due to the need to attain a Gaussian-like distribution of the tracer curve, the velocity range of 0 to 4.5 cm·sec$^{-1}$ was considered in observing dispersion coefficient. After crossing the velocity limit of 4.5 cm·sec$^{-1}$ the tracer curve missed several points due to the time interval of data recording which creates a misleading tracer curve for analysis.

In all three scenarios with changing vegetation conditions, the trend of dispersion coefficient increases with flow velocity. In the case of EAV, the turbulence intensity increase may be caused due to the sparse vegetative patterns inside of the flume causing wake production. For this exemplary setup, the vegetative density was 0.61%, which served as a sparse pattern of emergent vegetation inside the flume. Such type of turbulence increases with flow velocity but decreases with increasing vegetation density, as high vegetation density can reduce the flow speed. For the SAV scenario, two types of turbulences were observed for near wake structures: shear scale turbulence and wake scale turbulence. Shear scale turbulence may be produced due to the Kelvin-Helmholtz (KH) instability between the water surface and submerged wake structure, whereas wake scale turbulence is produced within the wake structures. The KH vortices dominate the entire flow domain when the depth of submergence is relatively small. Depth of submergence is the ratio of depth of water to the height of vegetation. Besides, the longitudinal dispersion is contributed by the transient storage developed within the vegetative layer for the depth of submergence smaller than 2.5. Within a velocity range of 1.5 cm·sec$^{-1}$ to 3.30 cm·sec$^{-1}$, the dispersion coefficient for the SAV showed higher values than the EAV due to the KH vortices and transient storage nature. Following that, the dispersion coefficient for the EAV increases at a higher rate than the dispersion coefficient for the SAV. For the MAV scenario, the distribution of dispersion coefficient with flow velocity lies between the SAV and EAV which displays the mixed turbulence effect of vegetation on dispersion coefficient. In the case of the NAV, the dispersion coefficient suddenly drops after the flow velocity reaches 3.5 cm·sec$^{-1}$. At low velocity range (<3.5 cm·sec$^{-1}$), the dispersion of tracer depends on the summation of longitudinal and lateral dispersion for the NAV scenario. When the velocity goes beyond that range of 3.5 cm·sec$^{-1}$, it is theorized the high flow velocity stabilizes the lateral flow inside the flume and thus diminishes the lateral dispersion of tracer. Absence of lateral dispersion at high flow velocity eventually limits the dispersion coefficient value.

All four scenarios show a variation of dispersion coefficient inside the span of flow velocity. It should be noted that one reason explaining the variability in the dispersion data may be the close proximity of the injection port to the detectors. This results in relatively short time periods for the pulse to disperse within the water column. This data gives an initial test of creating the APTV with the ability to measure both velocity and dispersion coefficients. Using a tracer with lower specific gravity would allow the distance from the injection port to the detectors to be increased. This may decrease the variability occurring at higher velocities and produce more consistent dispersion coefficients.

Exemplary Field Verification.

Figure 39:
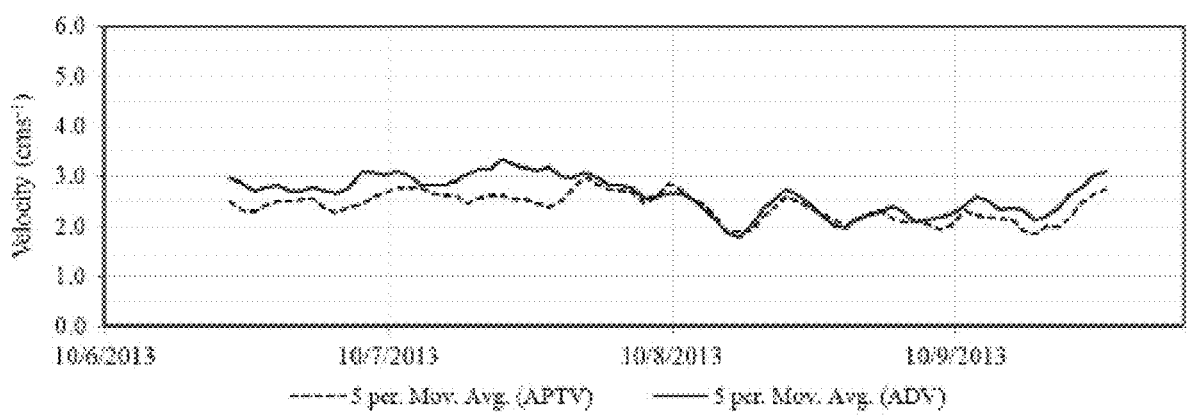
FIG. 39 is a graph comparing exemplary field site velocities of the Vector™ ADV and a calibrated cross-type ATPV.
Figure 40:
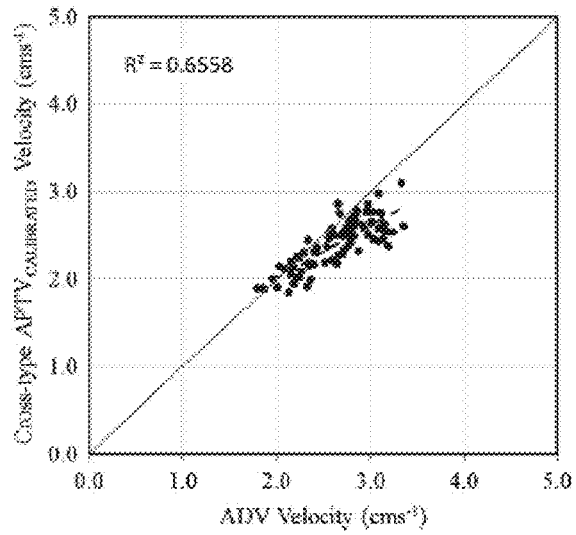
FIG. 40 is a graph comparing exemplary field site velocities of the Vector™ ADV and a calibrated cross-type APTV.

Velocity comparison of Vector ADV and cross-type APTV data for the field site is displayed graphically in FIG. 39. Field velocity data from both the Vector ADV and cross-type APTV indicate a flow regime dominated by a southerly flow direction at the sampling location. The x-axis (north-south) Vector™ ADV component was used for comparative analysis against the combined top and bottom detectors for the APTV (both of which detect pulses for southern flow). A total of 76 measurements were attempted by the APTV, of which 100% were detected. Velocities ranged from 1.75 cm·sec$^{-1}$ to 3.36 cm·sec$^{-1}$ for southerly flow. Data generally indicates good correlation between the two devices (R-squared 0.6558) with both the APTV and Vector™ ADV displaying similar variations in flow (as shown in FIG. 40). The highest discrepancy between the two devices was measured as 0.7 cm·sec$^{-1}$, representative of a 23% lower measurement by the APTV when compared to the Vector™ ADV. This discrepancy could be caused by an insufficient amount of measurements made by the APTV, slight variations in flow compared to the sampling volumes, or a slight underestimation of the calibration equation at higher velocities.

Figure 41:
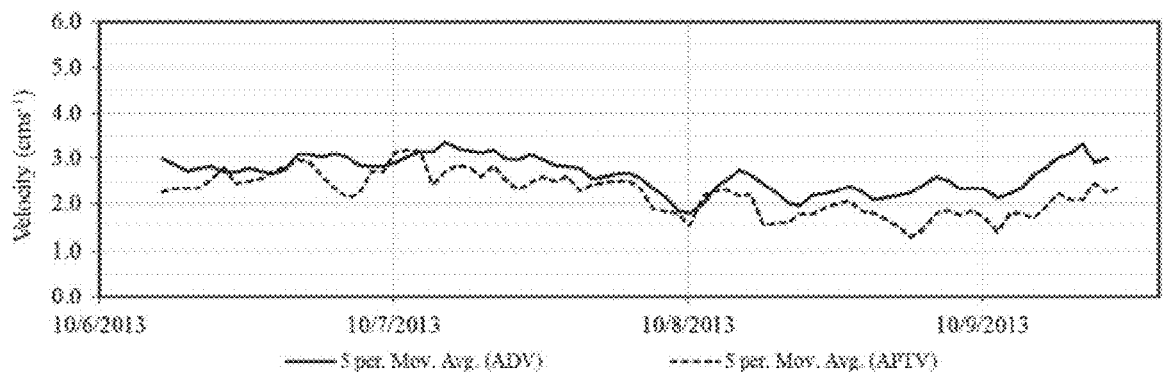
FIG. 41 is a graph comparing exemplary field site velocities of the Vector™ ADV and a calibrated arc-type APTV.
Figure 43:
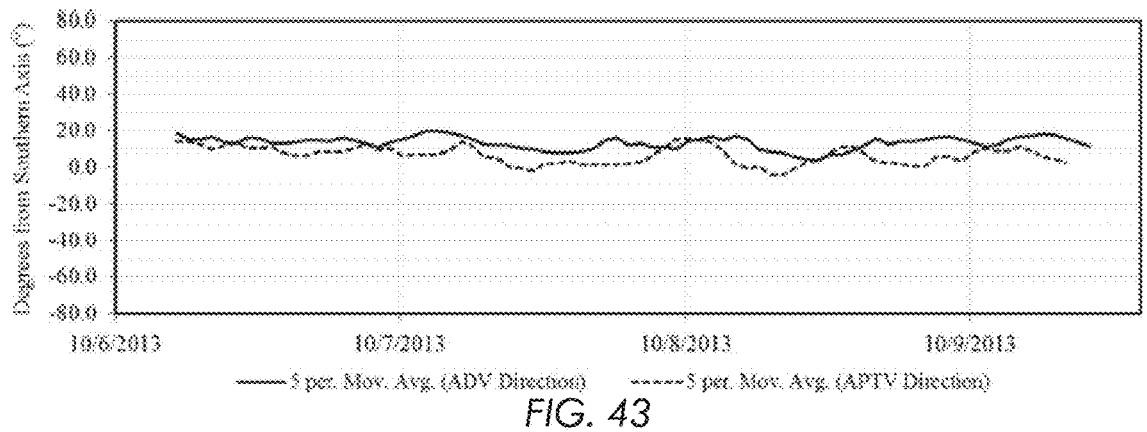
FIG. 43 is a graph comparing exemplary field site directional measurements of the Vector™ ADV and a calibrated arc-type APTV.

A velocity comparison of Vector ADV and arc-type APTV data for the field site is displayed graphically in FIG. 41. The velocity data indicates a flow regime dominated by a southerly flow direction by both the Vector™ ADV and arc-type APTV. For comparative purposes, the x-axis (north-south) Vector™ ADV velocity component was compared against the central detector (0°) for the APTV (orientated to detect southern flow). A 5-hour moving average was applied to both the APTV and ADV data. A total of 83 of the 84 sampling events were measured by the APTV, resulting in a 98.8% detection rate.

Figure 42:
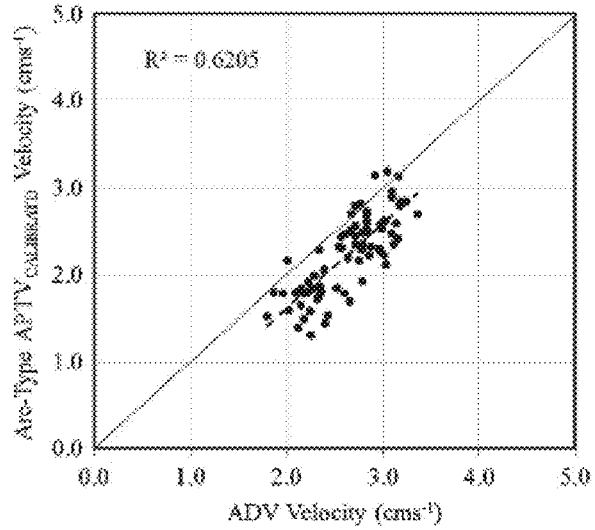
FIG. 42 is a graph comparing exemplary field site velocities of the Vector™ ADV and a calibrated cross-type APTV.

Data generally indicates good correlations between the two devices with both the APTV and Vector™ ADV displaying similar variations in flow. Data generally indicates good correlation between the two devices (R-squared 0.6205) with both the APTV and Vector™ ADV displaying similar variations in flow (as shown in FIG. 42). The directional components of the velocities were derived using the weighted average method and displayed in FIG. 43.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An arc-type automatic pulse tracer velocimeter (APTV) comprising:
   a detector frame having a bottom portion, a top portion and a side portion connecting the bottom portion and the top portion, wherein said side portion comprises a plurality of arcuate shaped side panels arranged so as to form a portion of a sphere having an axis, and wherein the arcuate shaped side panels are each defined by an arc disposed in a plane passing through said sphere axis;
   a plurality of detector wire pairs connected to the detector frame top portion and the detector frame bottom portion, wherein each of the plurality of detector wire pairs are distributed at approximately equal distances from each other along the detector frame top portion and the detector frame bottom portion, said detector wire pairs arranged along a portion of a cylindrical plane, said cylindrical plane having an axis that is collinear with said sphere axis;
   a support frame connected to the detector frame; and
   an injection port connected to the support frame and positioned along said cylinder axis such that said injection port is approximately equidistant from each of the plurality of detector wire pairs;
   wherein said side portion allows passage of fluid therethrough, allowing a fluid to pass through said side portion and across said plurality of detector pairs; and
   wherein said top portion comprises a surface for attaching a first end of each wire of said plurality of detector wire pairs, each said first end of each of said plurality of detector wire pairs attached to said surface of said top portion at an attachment point, forming a series of upper portion attachment points arranged along a curvilinear line defined as a circular arc having a center point disposed on said cylindrical plane axis, said arc having a radius equal to that of said cylinder; and said bottom portion comprises a surface for attaching a second end of each wire of each of said plurality of detector wire pairs, each said second end of each of said plurality of detector wire pairs attached to said surface of said bottom portion at an attachment point forming a series of bottom portion attachment points arranged along a curvilinear line defined as a circular arc having a center point disposed on said cylindrical plane axis, said arc having a radius equal to that of said cylindrical plane; such that each detector wire pairs of said plurality of detector wire pairs extends between said top portion surface and said bottom portion surface, each wire of said plurality of detector wire pairs being disposed parallel to said cylinder axis.

2. The arc-type APTV of claim 1, wherein the bottom portion, top portion and side portion of the detector frame are arcuate, the side portion of the detector frame has a first end and a second end opposite the first end, the first end of the side portion of the detector frame is connected to the top portion of the detector frame and the second end of the side portion of the detector frame is connected to the bottom portion of the detector frame and the bottom portion of the detector frame is parallel to the top portion of the detector frame.

3. The arc-type APTV of claim 1, wherein the side portion of the detector frame comprises a plurality of arcuate side panels each having a first end and a second end opposite the first end, wherein each of the first ends of the side panels is connected to the top portion of the detector frame and each of the second ends of the side panels is connected to the bottom portion of the detector frame.

4. The arc-type APTV of claim 1, wherein a portion of each of the wires of the plurality of detector wire pairs is stripped of insulation.

5. The arc-type of claim 1, further comprising:
   a hydrofoil positioned on the injection port.

6. A cross-type APTV comprising:
   a detector frame having a vertical portion having a top portion and a bottom portion, a horizontal portion having a left portion and a right portion and a central portion, wherein the vertical portion and the horizontal portion are connected at the central portion to form a cross shape, the top portion of the vertical portion has a first opening there through, the bottom portion of the vertical portion has a second opening there through, the left portion of the horizontal portion has a third opening there through and the right portion of the horizontal portion has a fourth opening there through;

a first detector wire pair connected to the top portion of the vertical portion of the detector frame and to the central portion, wherein the first detector wire pair is at least partially suspended over the first opening;

a second detector wire pair connected to the bottom portion of the vertical portion of the detector frame and to the central portion, wherein the second detector wire pair is at least partially suspended over the second opening;

a third detector wire pair connected to the left portion of the horizontal portion of the detector frame and to the central portion, wherein the third detector wire pair is at least partially suspended over the third opening;

a fourth detector wire pair connected to the right portion of the horizontal portion of the detector frame and to the central portion, wherein the fourth detector wire pair is at least partially suspended over the fourth opening;

a support frame connected to the detector frame at an end of the top portion of the vertical portion; and an injection port connected to the support frame and positioned about parallel to the vertical portion of the detector frame and at a predetermined distance from the third detector wire pair and the fourth detector wire pair.

7. The cross-type APTV of claim 6, wherein a portion of each of the wires of the first, second, third and fourth detector wire pairs is stripped of insulation.

8. The cross-type APTV of claim 6, further comprising:
a hydrofoil positioned on the injection port.

* * * * *